United States Patent [19]

Matsuura

[11] Patent Number: 4,807,143
[45] Date of Patent: Feb. 21, 1989

[54] SYSTEM FOR FORMING DESIGN PATTERN DATA

[75] Inventor: Susumu Matsuura, Tokyo, Japan

[73] Assignee: Asahi Kasei Kogyo Kabushiki Kaisha, Osaka, Japan

[21] Appl. No.: 70,878

[22] Filed: Jul. 6, 1987

[30] Foreign Application Priority Data

Jul. 7, 1986 [JP] Japan .................. 61-159313
Jul. 8, 1986 [JP] Japan .................. 61-160625

[51] Int. Cl.$^4$ .......................... G06F 3/14; G06K 9/00; H04N 1/00
[52] U.S. Cl. ..................... 364/468; 364/470; 364/518; 364/167.01; 382/9; 382/58
[58] Field of Search .............. 364/518, 520, 521, 468, 364/470, 188, 190, 189; 358/101, 107; 382/9, 44, 48, 61

[56] References Cited

U.S. PATENT DOCUMENTS

| | | | |
|---|---|---|---|
| 3,844,139 | 10/1974 | De Cerjat et al. | 364/900 |
| 3,887,903 | 6/1975 | Martell | 340/172.5 |
| 3,973,245 | 8/1976 | Belser | 364/200 |
| 4,346,405 | 8/1982 | Yoda et al. | 382/9 |
| 4,361,830 | 11/1982 | Honma et al. | 340/146.3 |
| 4,459,677 | 7/1984 | Porter et al. | 364/900 |
| 4,475,161 | 10/1984 | Stock | 364/521 |
| 4,564,915 | 1/1986 | Evans et al. | 364/521 |
| 4,566,124 | 1/1986 | Yamamoto et al. | 382/21 |
| 4,566,126 | 1/1986 | Miyagawa et al. | 382/48 |
| 4,589,144 | 5/1986 | Namba | 364/518 |
| 4,660,484 | 3/1987 | Yasui | 364/470 |
| 4,716,542 | 12/1987 | Peltz et al. | 364/518 |

OTHER PUBLICATIONS

An Office Action in corresponding German Application P3722444.1 and an English translation thereof.

Primary Examiner—Jerry Smith
Assistant Examiner—Paul Gordon
Attorney, Agent, or Firm—Finnegan, Henderson, Farabow, Garrett & Dunner

[57] ABSTRACT

In a design pattern data forming system, a design pattern such as an apparel pattern having marks for discriminating feature points of the pattern is read by an image reader to prepare binary picture element data. The picture element data is processed by a computer to prepare an X-Y point series data consisting of X and Y addresses corresponding to outer profile lines of the design pattern at every three scanning lines sequentially scanned in the Y direction. From the X-Y point series data, positions corresponding to the feature points are extracted and data between adjacent feature points are divided as line data. The X and Y addresses of X-Y point series data interconnecting start and end points corresponding to the feature points and an intermediate point(s) of the line data are stored in a memory. The X-Y point series data have line data arranged as one complete trace data for the pattern profile, and feature point codes representing contents of the feature points are associated with the start and end points of the line data. The system can automatically read design pattern data without requiring a specially skilled operator by merely loading a sheet of paper or a cutout pattern piece into the image reader to recognize feature points at a high speed in a simple manner.

12 Claims, 34 Drawing Sheets

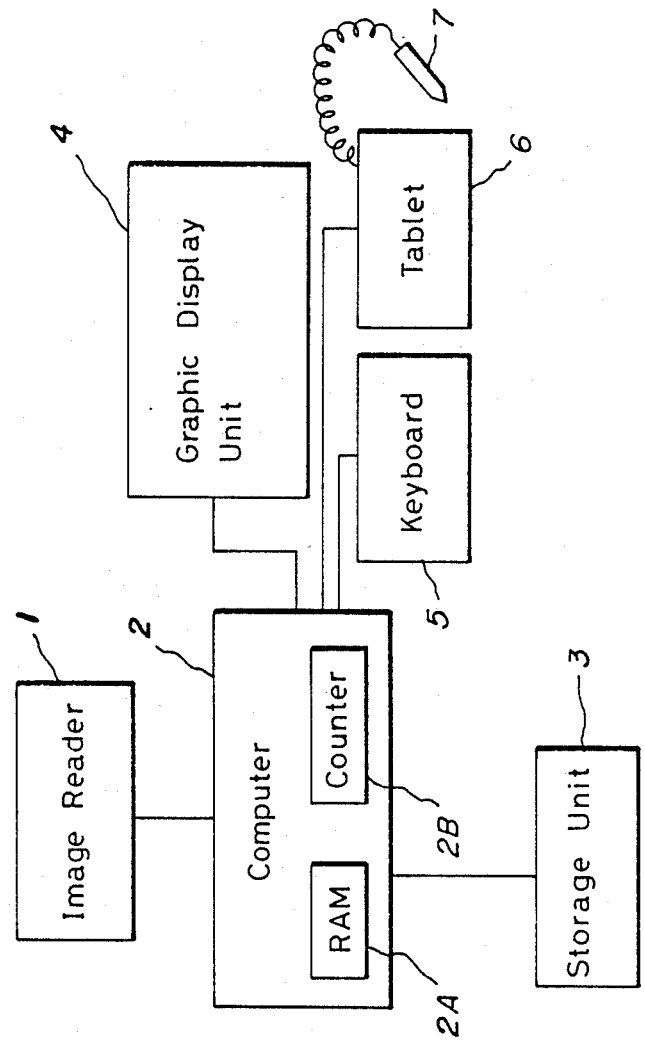

| $X_{154}$ | $Y_{10}$ | $Y_{14}$ |
| --- | --- | --- |
| $X_{155}$ | $Y_2$ | $Y_4$ |
| $X_{155}$ | $Y_9$ | $Y_{13}$ |
| $X_{156}$ | $Y_9$ | $Y_{12}$ |

FIG.5B

```
LB              × × ⊗ ×              8th Line
LC            × × × × × × ×          9th Line
LN1,LN2       × × × ×  × × × ×       10th Line
              ‾‾‾‾‾‾  ‾‾‾‾‾‾‾
               LN1      LN2
```
⇩

(a) | 0 | 0 | 0 | 0 | 0 | 0 | 0 |  ⟵ 2B

↓

(b) | 0 | 1 | 1 | 1 | 1 | 0 | 0 |  ⟵ 2B

↓

(c) | 0 | 1 | 1 | 1 | 1* | 1 | 0 |  ⟵ 2B

⇩

```
LB              × × ⊗ ×              8th Line
LC            × ⊗ ⊗ ⊗ ⊗ ⊗ ×          9th Line
LN1,LN2       × × × ×  × × × ×       10th Line
```

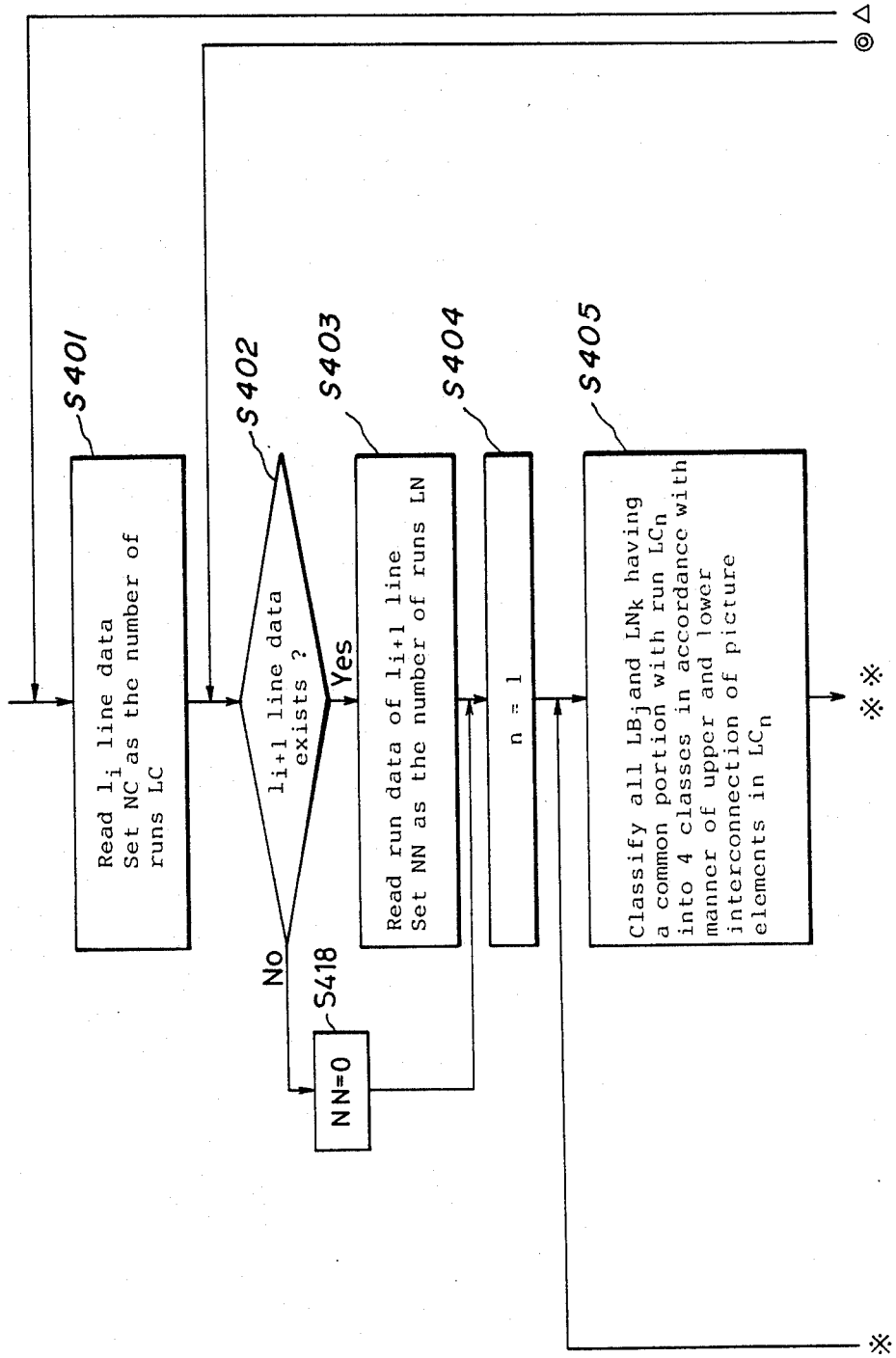

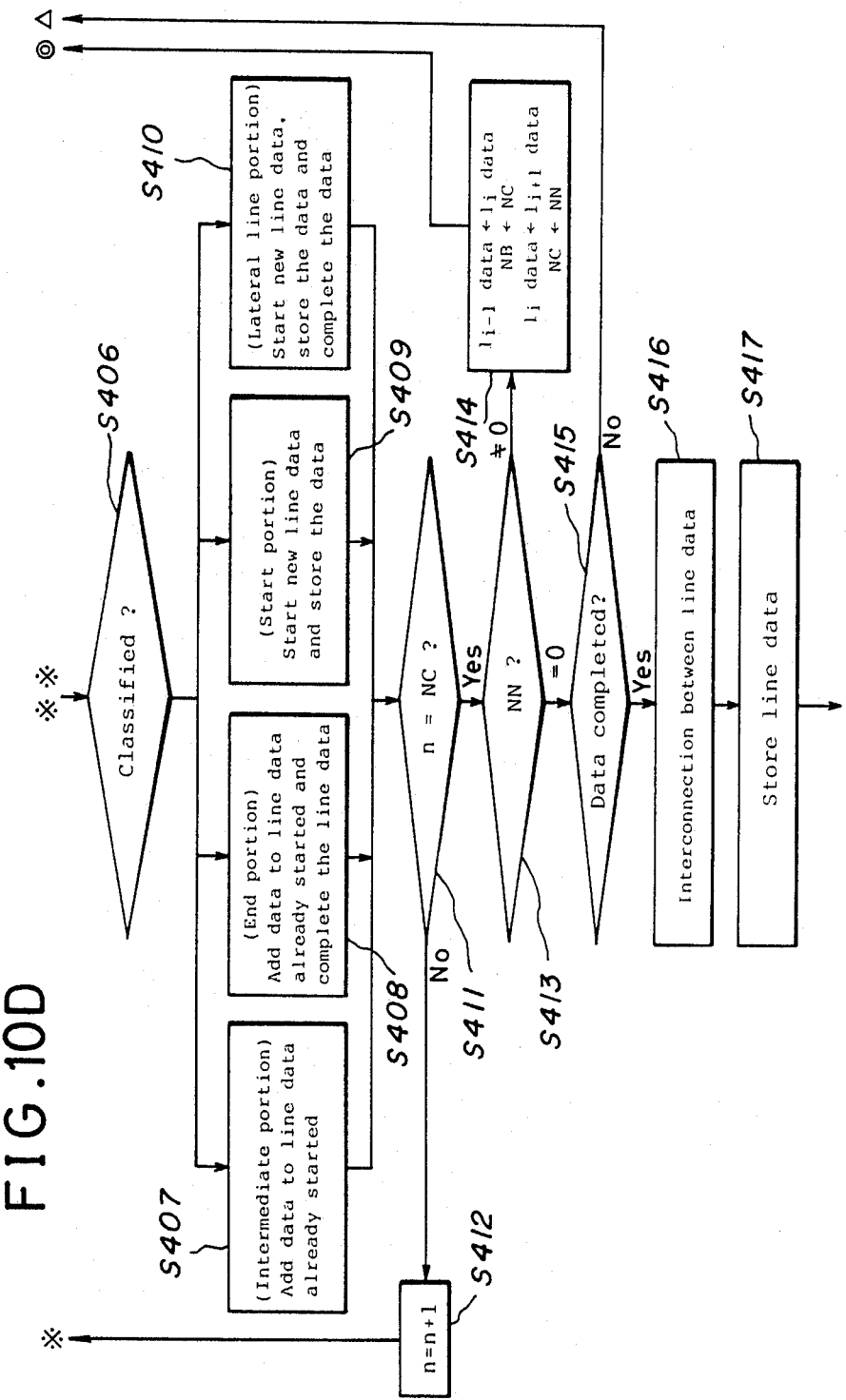

FIG. 15E
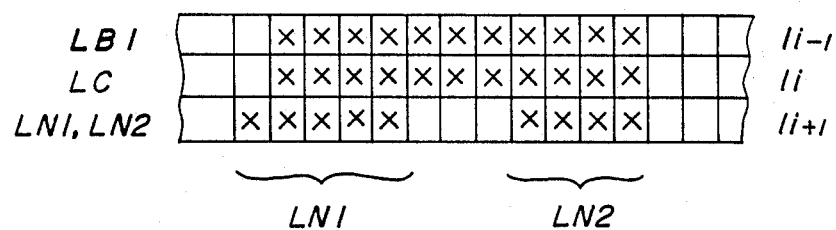
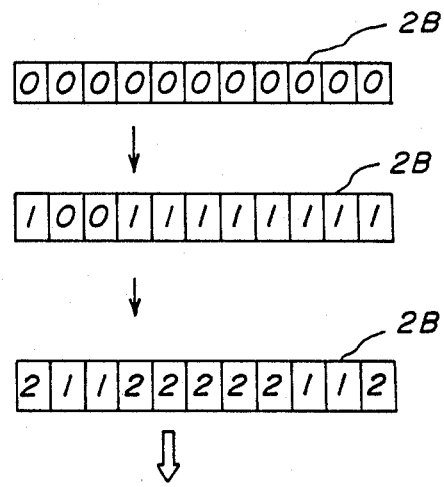
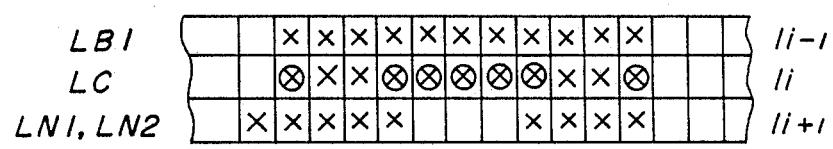

FIG.18A  FIG.18B
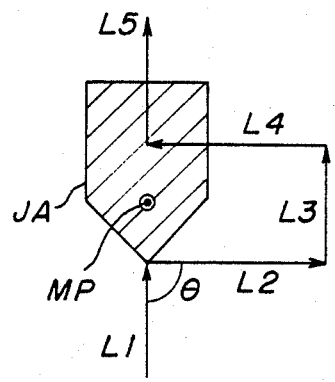 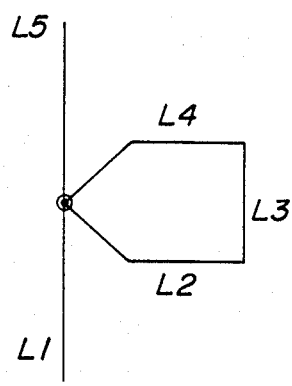
FIG.18C  FIG.18D
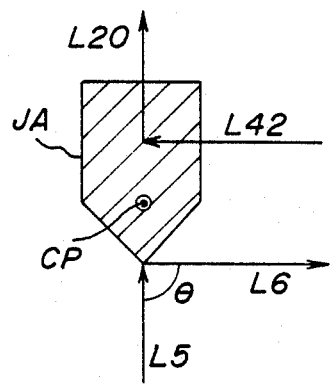 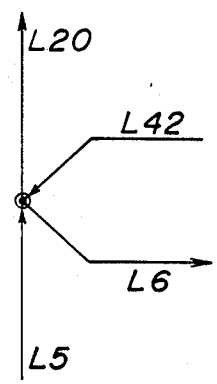

SYSTEM FOR FORMING DESIGN PATTERN DATA

BACKGROUND OF THE INVENTION

1. Field of the Invention

The present invention relates to a system for forming design pattern data which are suitable to be inputted into a storage unit of a computer or the like as pattern data of design patterns on paper or cutout pattern pieces in an efficient and economical manner, and more particularly to a system for storing data of shape of design pattern and information written thereon in the form of digital data by utilizing an image reader and arithmetic logic means such as a computer.

The present invention is applicable to an industry in which a plurality of design patterns are prepared; data concerning the design patterns are stored in a computer system; and in accordance with the stored data, various designs can be accomplished by changing and modifying configurations of the design patterns and making layouts. The present invention is further applicable to processing of design pattern data in various fields in which a variety of models and variations in size are required, for example, in which cloth, leather or the like are cut and sewn, like in case of apparel, seats of automotive vehicles, sofas, shoes, bags and so on, typically in the apparel industry.

2. Description of the Prior Art

Automatic processing techniques for the processing of line profile data, such as design patterns, are classified as one of the applications of computer technology. The technique involves reading a drawing and binary-coded pattern recognition for line-profile patterns like in the case of character recognition. Binary-coded data obtained from a line-profile pattern is processed so that the line-profile pattern data are converted into data representing fine lines and can be expressed in the form of vectors.

In a conventional case where data of design patterns are inputted into a design system utilizing a computer or a so-called CAD system, a sheet of paper on which design patterns are drawn is placed on a conventional coordinate reader or digitizer in the form of a large flat plate or pattern pieces are placed thereon. Then, a coordinate indicator, such as a stylus pen or a cursor, is positioned at a position of the patterns that is desired to be converted into data, and activated to input the X-Y dot series date (for instance, see U.S. Pat. No. 3,887,903).

However, the above-mentioned systems have problems in that a special operator is required to input the pattern data. While inputting the data, it is required that the operator repeat precise and simple operations. Since a long period of time is required for the input of the pattern data, it is likely that erroneous inputting operations will occur, such as the failure to input required data or the input of incorrect data. Under the circumstances, it is required that data be inputted automatically.

Furthermore, conventional pattern readers can be used so that pattern data are digitized and automatically inputted. In this system, problems occur when the amount of pattern data becomes large relative to the area of a sheet of paper and accordingly a large capacity storage unit is required. The processing time is increased in proportion to the amount of data, and a longer time is required in order to modify the data because specific points representing characteristics or features inherent to a design pattern or feature points cannot be recognized with a satisfactory degree of accuracy.

Especially, the conventional method is not suitable for processing data wherein the amount of line data to be processed is small relative to the area of a sheet of paper, such as the line data of a large design pattern drawn on a sheet of paper or a large cut out piece of a design pattern.

Moreover, there has been a demand for an input system in which spurious data due to dust, dirt, and soil can be removed; unsatisfactory data can be corrected, deleted or moved; or additional data can be inputted in a simple manner. Especially, in an apparel industry, various kinds of clothing are fabricated in a small quantity and the sizes of the clothing are frequently changed, so that it is complicated to input pattern data each time so that the clothes are changed in design and size. In view of this, it is necessary to prepare pattern data in advance in such a way that the pattern data can be easily corrected in accordance with data once inputted.

SUMMARY OF THE INVENTION

In view of the above, it is an object of the present invention to provide a system for forming design pattern data which substantially eliminates the above-described disadvantages encountered in the prior art systems, which can automatically read design pattern data without requiring a specially skilled operator, by merely loading a sheet of paper on which design patterns are drawn or upon which a cutout pattern piece is supported into a pattern reading apparatus such as a scanner to recognize feature points at a high speed and in a simple manner.

Another object of the present invention is to provide a system for forming design pattern data in which the data can be automatically inputted into a design system utilizing a computer, or can be automatically stored in a computer at a high speed without failure.

It is another object of the present invention to provide a system for forming design pattern data which can automatically input data concerning a design pattern including recognition of feature points thereof into a design system utilizing a computer, or can automatically store the data into a computer without failure at a high speed.

It is a further object of the present invention to provide a system for forming design pattern data in which a curved line and a straight line of a design pattern are easily distinguished from each other when utilizing the design pattern data.

It is still a further object of the present invention to provide a system for forming design pattern data which can facilitate correction, deletion, addition or displacement of the inputted pattern data in a simple manner by man-machine interaction.

These and other objects are achieved by a system for forming design pattern data comprising means for scanning a design pattern having predetermined marks by which feature points can be discriminated in X and Y directions perpendicular to each other, to generate binary picture element data comprising a plurality of picture elements; means for preparing X-Y point series data associated with X and Y direction addresses in an X-Y point series formed by interconnecting substantially central picture elements with picture elements corresponding to a profile portion of the binary picture element data; means for extracting positions corresponding to the feature points from the X-Y point series data; means for dividing data between respective adjacent feature points into line data and storing all X-Y point series data corresponding to each line data, each of the X-Y point series data consisting of X and Y direction addresses with respect to X-Y point series interconnecting a start point, intermediate points, and an end point of each line data, the start and end points corresponding to feature points; means for selecting the line data so as to define one complete trace of an outer profile line around the design pattern and preparing X-Y point series data in which feature point codes representing feature points correspond to the start, and end points are associated with the start and end points of each line data; and means for storing the X-Y point series data.

The present invention further contemplates a method for forming design pattern data comprising the steps of scanning with an image scanner a design pattern that has predetermined marks by which feature points can be discriminated in X and Y directions perpendicular to each other to generate binary representations of picture elements representing the design pattern, preparing X-Y point series data associated with X and Y direction addresses in an X-Y point series formed by discriminating central picture elements located substantially centrally within the design pattern, and profile picture elements which correspond to picture elements located in a profile portion of the design pattern, extracting from the X-Y point series data positional data corresponding to feature points in the design pattern, dividing data between respective adjacent feature points as line data, and storing all X-Y point series data corresponding to each line data, each of the X-Y point series comprising of X and Y direction addresses with respect to an origin point of each line data, intermediate points of each line data, and an end point of each line data, the origin and end points corresponding to feature points, arranging the line data to define one complete trace of an outer profile line around the design pattern and preparing X-Y point series data in which feature point codes represent contents with respect to feature points corresponding to the start and end points of each line data, and storing the prepared X-Y point series data.

BRIEF DESCRIPTION OF THE DRAWINGS

FIG. 1 is a block diagram showing an embodiment for carrying out the present invention;

FIG. 5B is an explanatory diagram used to explain one example of the process for narrowing a width of a line;

FIGS. 10C and 10D are flowcharts illustrating, in combination, a process for preparing line data;

FIG. 15E is an explanatory diagram used to explain one example of the process for extracting outer profile picture elements;

FIGS. 18A and 18B are explanatory diagrams used to explain how to process a notch in an outer profile line;

FIGS. 18C and 18D are explanatory diagrams used to explain how to process adjacent profile lines;

DETAILED DESCRIPTION OF PREFERRED EMBODIMENTS

Figure 2A:
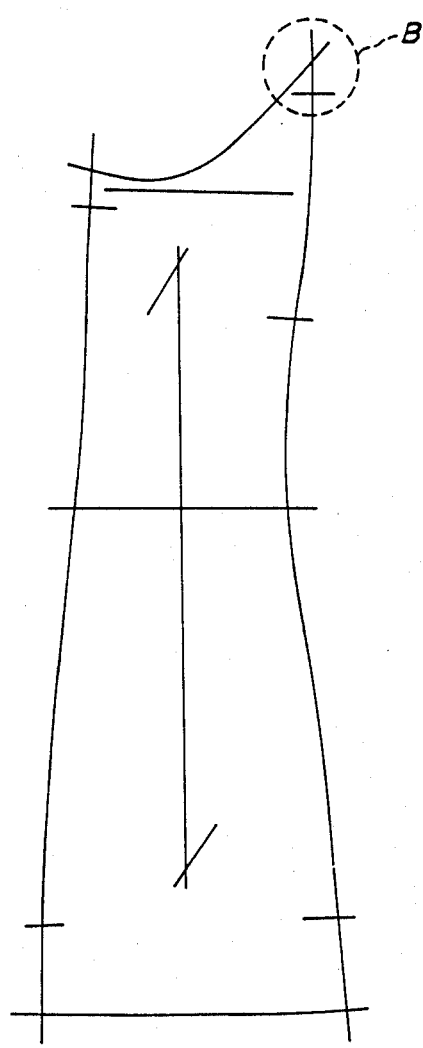
FIG. 2A is an explanatory diagram used to explain one example of a sheet of paper on which a design pattern is previously drawn.

The present invention will be described in case that pattern data obtained from design pattern of clothing used in an apparel industry are represented in terms of coordinates to prepare data which can be used in a CAD system.

According to the present invention, outer profile data of a design pattern piece data can be quickly processed in a simple manner by merely reading a sheet of paper on which a design pattern is drawn or a cutout pattern piece by an image reader. The data of the design pattern can be inputted into a design system utilizing a computer or stored in a computer at a high speed without failure.

In case of a design pattern for clothing, the feature points of the pattern mean a corner of the pattern, a position at which a line characteristic changes (for instance, a junction point between a straight line and a curved line), a position of a notch (as a countermark) and a point of intersection between an outer profile and an internal line or between internal lines. By utilizing such feature points, the pattern data inputted into the computer are processed to increase or reduce the pattern size, to provide sewing allowance, to change profiles and so on. Furthermore, in case of outputting a smooth curved line by interpolation, such as a smoothing process by an automatic drafting apparatus such as a coordinate plotter, the feature points can be used as the end points of a section in which the smoothing process is carried out.

The manner by which the above and other objects, effects, features and advantages of the present invention are achieved will become fully apparent from the following description of preferred emodiments taken in conjunction with the accompanying drawings, wherein:

FIG. 1 shows an embodiment of an apparatus for carrying out the method in accordance with the present invention. This apparatus comprises an optical image reader 1, such as a scanner, for reading out pattern data from a design pattern drawn on a sheet of paper or a design pattern cutout itself; a computer 1 for processing the pattern data; a storage unit 3, such as a magnetic disc unit, a magnetic tape unit, or the like, for storing data processed by the computer 2; and a graphic display unit 4 for displaying the data processed by the computer. Reference numeral 5 represents a keyboard for inputting data and commands into the computer 2 and carrying out man-machine interaction through the display unit 4. A tablet 6 is provided for indicating patterns and menus to be displayed on the screen of the display unit 4, and a stylus pen 7 is used for pointing a desired point of the patterns and menus on the screen.

Embodiment 1:

A first embodiment 1 of the present invention will be described. First, as shown in FIG. 2A, there is prepared a sheet of paper on which a design pattern is drawn. On the sheet of paper, the portions such as corners, notches and so on, of an outer profile line of the pattern are defined as feature points expressed by a cross line crossing the outer profile line by about 3–5 mm. In this manner the end points and intersections of the outer profile lines are marked as the feature points.

The sheet of paper is inserted into the optical image reader 1 in which the pattern on the sheet of paper is read out in the longitudinal direction (to be referred to as "sub-scanning direction" in this specification) and is scanned a line at a time in the widthwise direction (to be referred to as "main scanning direction" in this specification hereinafter) of the sheet of paper, so that data, represented in units of picture elements, is digitized depending on brightness level.

Figure 2B:
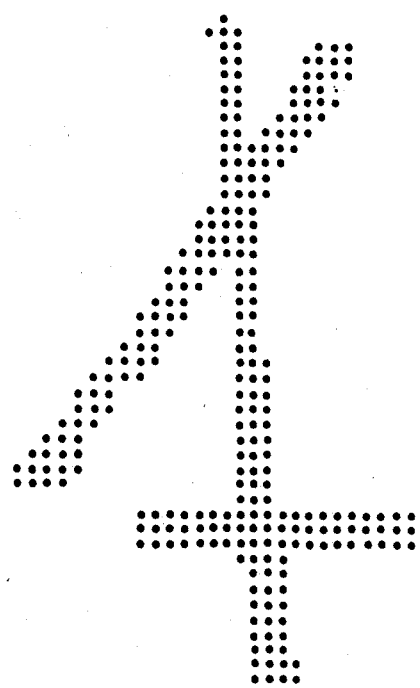
FIG. 2B is an explanatory diagram used to explain, in an enlarged manner, one portion of binary coded data thereof.

When the digital data having varied levels from one picture element to another are discriminated at a suitable threshold value so that the digital data are represented in terms of binary data, the pattern data in the portion B in FIG. 2A is converted into point data having black picture elements corresponding to the profile line portion, as shown on an enlarged scale in FIG. 2B.

Next a group of X-Y point series data which passes approximately the center of the profile line and which are connected to each other by a unit of picture element is prepared by the process for narrowing the width of the line (hereinafter referred to as "the line narrowing process"). The method in the first embodiment, described in detail below, shows how to carry out the line narrowing process of the data at a high speed for an apparel pattern sheet which features a low density of profile lines and a large size.

Figures 3A, 3B:
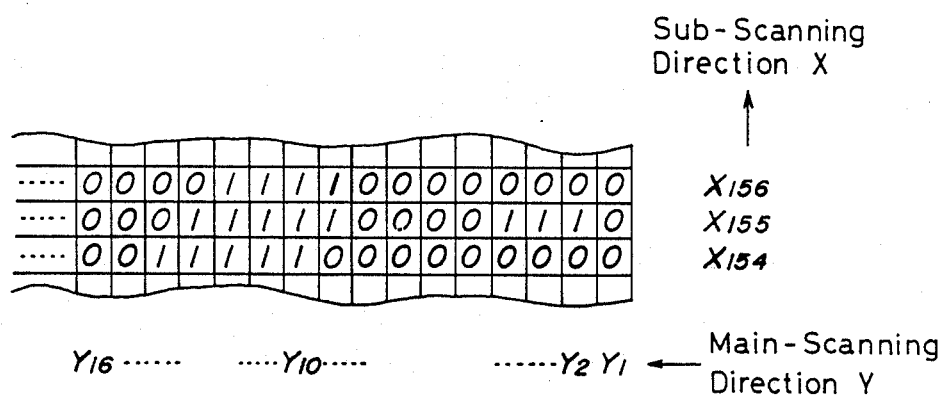
FIG. 3A is an explanatory diagram used to explain one example of data read out by an image reader.
FIG. 3B is an explanatory diagram used to explain an arrangement of readout data.

As shown in FIG. 3A, a portion consisting of a series of black picture elements is selected from binary data of each line obtained by scanning in the main scanning direction by the optical image reader 1. Here, an address of the portion in the sub-scanning direction X is computed as a first word. A start address of the black picture element in the main scanning direction Y is computed as a second word. An end address of the black picture elements in the main scanning direction Y is computed as a third word. A data arrangement consisting of the first, second and third words is stored in a RAM 2A of the computer 2 in the form of the format as shown in FIG. 3B.

This data arrangement is a kind of run length code and is not for compressing an information amount, but is for expressing the pattern data in terms of a word, which is a unit of information processing in the computer 2, in order to ensure facility of operation and a high speed in the computer 2.

The data arrangement concerns data on one line in the main scanning direction, so that a length of a series of black picture elements is long for the profile line in the main scanning direction Y (that is, in the widthwise direction of the sheet of paper), but is short for the profile line in the sub-scanning direction (that is, in the longitudinal direction of the sheet of paper). A line that is substantially in parallel with the main scanning direction of the sheet of paper is referred to as H line, and a line that is substantially in parallel with the sub-scanning direction H is referred to as a V line. The H and V lines are distinguished from each other in a manner to be described below.

In this specification, the three-word information group representative of a group of black picture elements obtained by the binarization process is called a "run" and the number of successive black picture elements is called a length L of the run. Now, it is assumed that a constant of a numerical value equal to about three times the number of black picture elements corresponding to the average width of the profile line is represented by W. If L<W, the run is defined as a part of the V line.

If L≧W, the run is defined as a part of the H line.

Furthermore, when one picture element has an adjacent picture element in one of the four main directions (upper, lower, left and right directions), the two picture elements are regarded as being interconnected. The process for extracting specific picture elements in this manner and for preparing an interconnecting picture element with respect to the specific picture element in such a way that the line width is equal to one picture element is referred to as the "line-narrowing process" in this specification. The line-narrowing process for interconnecting the picture elements in the eight directions including the four inclined directions in addition to the four main directions can also be carried out, but in the first embodiment, only the interconnections in the four main directions will be described.

After a run has been defined in the manner described above, the interconnection relationship of the runs between three lines ($l_{i-1}$, $l_i$, $l_{i+1}$) in the main scanning direction is judged and the line-narrowing process of the center line $l_i$ is carried out for each run unit. In this case, it is assumed that the runs of the $l_{i-1}$ line, which have already undergone the line-narrowing process, are represented by $LB_1$, $LB_2$, ..., and $LB_n$. A run of the $l_i$ line that undergoes the line-narrowing process is represented by LC. The runs of the $l_{i+1}$ lines which undergo the line-narrow process are represented by $LN_1$, $LN_2$, ..., and $LN_m$. In this case, the run LC is classified into seven patterns (a)–(g) shown in FIGS. 4A–4G, depending upon the interconnection modes between the runs $LB_j$(j=1, 2, - - -, n) and $LN_k$(k=1, 2, - - -, m) connected to the front and the rear of the center line $l_i$ in the sub-scanning direction. In FIG. 4, a position at which a black picture element exists is indicated by a mark "X". Marks Ⓧ on the line $l_{i-1}$ represent the black picture elements which have been already selected by the line-narrowing process. Also in FIG. 4, the hatched black picture elements on the line $l_i$ indicate picture elements selected by the line-narrowing process.

Figure 4A:
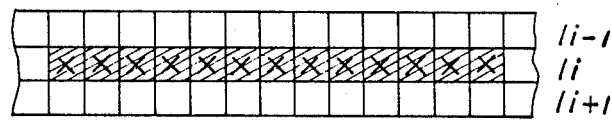
FIGS. 4A-4G are explanatory diagrams used to explain run LC in the process of narrowing a width of a line.

(a) Isolated portion (FIG. 4A)

In this case, there exists no $LB_j$ nor $LN_k$ in relation to LC.

Figure 4B:
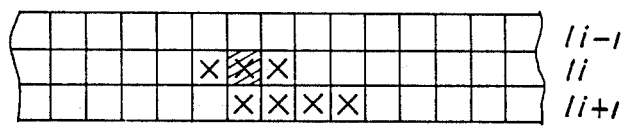

(b) Start portion A (Fig. 4B)

In this case, there exists no $LB_j$, but exists one $LN_k$ in relation to LC.

Figure 4C:
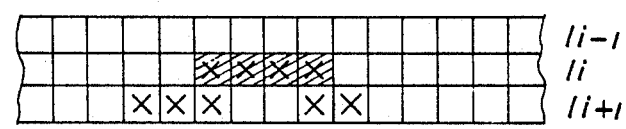

(c) Start portion B (FIG. 4C)

In this case, there exists no $LB_j$ but exist a plurality of $LN_k$ in relation to LC.

Figure 4D:
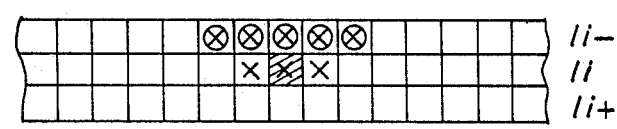

(d) End portion A (FIG. 4D)

In this case, there exists no $LN_k$ but exists one $LB_j$ in relation to LC.

Figure 4E:
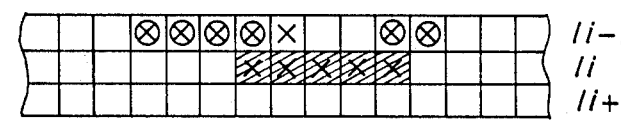

(e) End portion B (FIG. 4E)

In this case, there exists no $LN_k$, but exist a plurality of $LB_j$ in relation to LC.

Figure 4F:
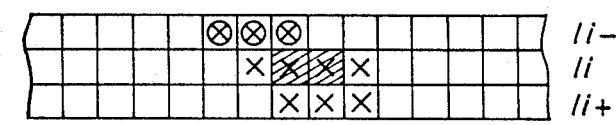

(f) intermediate portion A (FIG. 4F)

In this case, there exists one $LB_j$ and one $LN_k$ in relation to LC.

Figure 4G:
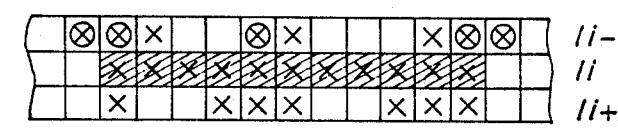

(g) Intermediate portion B (FIG. 4G)

In this case, there exists one or more $LB_j$ and $LN_k$ in relation to LC and there exists two or more $LB_j$ and/or $LN_k$.

The start portion A, the end portion A or the intermediate portion A appears in the case of a straight line. The start portion B, the end portion B and the intermediate portion B appear when a line is branched, when two lines are joined, and when two lines intersect each other, respectively.

In this specification, the run of the line $l_{i-1}$ which has already undergone the line-narrowing process and is in an interconnected condition is represented by LB. The run of the line $l_i$ which is not subjected to the line-narrowing process is represented by LC. The run of the succeeding line $l_{i+1}$ is represented by LN.

The line-narrowing process for the run LC is carried out by the comparison of the constant W with the length L of each run in each of the seven patterns (a)–(g). When the run LC is found to be a part of the V line, the picture element at the mid-point of the run LC is selected, but when it is found to be the H line, all of the picture elements in the run LC are selected. Furthermore, when both of LC and LN are found to be parts of the H line, a picture element to be interconnected to the line LN is selected. When the run LC has a plurality of runs LB and LN as shown in FIG. 4G, picture elements are selected in the run LC with respect to the combinations of ($LB_1$,LC,$LN_1$), ($LB_1$,LC,$LN_2$), ($LB_1$,LC,$LN_3$), ($LB_2$,LC,$LN_1$), ($LB_2$,LC,$LN_2$), ($LB_2$,LC,$LN_3$), ($LB_3$,LC,$LN_1$), ($LB_3$,LC,$LN_2$) and ($LB_3$,LC,$LN_3$). More particularly, the line-narrowing process is carried out in accordance with the processing steps shown in TABLE 1.

In TABLE 1, a portion in which the run LC overlaps one or both of the runs LB and LN in the main scanning direction is referred to as "common portion" in this specification, while the remaining portion is referred to as "non-common portion", and the ends of the common portion is referred to as "end common portions". Furthermore, the section between the end common portion and its adjacent non-common portion is referred to as "end common portion+non-common portion".

TABLE 1

| pattern | condition | method for processing LC (When a black picture element is selected, it is represented by ON. But if it is not selected, it is represented by OFF, depending upon the result of the line-narrowing process.) |
|---|---|---|
| (a) Isolated portion | LC≧W | All the black picture elements of LC are rendered ON. |
| | LC<W | All the black picture elements of LC are rendered OFF. |
| (b) start portion A | LC≧W and $LN_k$≧W | The black picture elements in the end common portion + non-common portion are rendered ON. |
| | LC≧W and $LN_k$<W | All the black picture elements of LC are rendered ON. |
| | others | The center black picture element of the common portion in common with $LN_k$ are rendered ON. |
| (c) start portion B | LC≧W | When $LN_k$≧W, +1 is added to the end common portion + non-common portion. When $LN_k$<W, +1 is added to all LC. After the completion of all combinations, the black picture element having the maximum value is rendered ON. |
| | LC<W | The black picture elements in the common portion of LN are rendered ON. After the completion of all combinations, OFF black picture elements between ON black picture elements are rendered ON. |
| (d) end portion A | LC<W | The black picture elements from the midpoint of the common portion in common with LB to the |

TABLE 1-continued

| pattern | condition | method for processing LC (When a black picture element is selected, it is represented by ON. But if it is not selected, it is represented by OFF, depending upon the result of the line-narrowing process.) |
|---|---|---|
| | other | midpoint of LC are rendered ON. The black picture elements in the end common portion + non-common portion in common with LB are rendered ON. |
| (e) end portion B | none | +1 is added to the end common portion + non-common portion in common with LB. After the completion of all combinations, a black picture element having the maximum value is rendered ON. |
| (f) intermediate portion A | LC<W | When the center black picture element in the common portion in common with LN has a common portion in common with a portion of LB except the end portions of LB, the picture element is rendered ON. In other cases, the black picture elements from the center black picture element in the common portion in common with LN to the end common portion of LB closer to the center black picture element in said common portion are rendered ON. |
| | LC≧W | In addition to the processing in the case of LC<W, the black elements in the end common portion + non-common portion in common with LB are rendered ON. |
| (g) intermediate portion B | LC<W | When the common portion in common with LB, LC and $LN_k$ exists with respect to all combinations, the center black picture element of the common portion is rendered ON. When non-common portion in common with LB, LC and $LN_k$ exists, the black picture elements from the end common portion of LB to the common portion in common with $LN_k$ are rendered ON. |
| | LC≧W and all $LN_k$<W | In order to utilize the black picture elements in LC, the following steps are carried out: |
| (g) intermediate portion B | | (1) +1 is added to the end common portion + non-common portion in connection with LB and after the completion of all combinations, the black picture element having the maximum value is rendered ON.<br>(2) In addition to the result of step (1), when the common portion in connection with LB, LC and $LN_k$ exists, the center black picture element of the common portion is rendered ON. |
| | LC≧W and $LN_k$ there exists ($LN_k$≧W) | In order to utilize the black picture elements in $LN_k$, the following steps are carried out:<br>(1) When $LN_k$≧W, +1 is added to the end common portion + non-common portion in common with $LN_k$.<br>(2) −1 is added to the center common portion of LB except the ends of the common portion in common with LB and LC.<br>(3) As a result of the steps (1) and (2), the black picture element having the maximum value of one or more is rendered ON.<br>(4) When a common portion in common with LB, LC and $LN_k$ exists, the center black picture element in the common portion is rendered ON. |

The computer 2 uses an internal or software-implemented ("soft") counter 2B with an initial value equal to zero. Each black picture element is represented by "ON" or a "1" at a counter stage corresponding to the seam position of the black picture element. During the processing of LN2, the counter stages having a value of "1" remain unchanged if the corresponding stage of the run LN2 has a value of "0" or "1".

The positions of the black picture elements selected by the line-narrowing process in the sub-scanning direction is defined as an X value, while the positions thereof in the main scanning direction is defined as a Y value. Thereafter, these X and Y values are stored as an X-Y point series data group in the RAM 2A in the computer 2. Concurrently, these X and Y values are stored in the form of a data arrangement having the same format as those shown in FIG. 3B, so that the data correspond to the run LB when the next line is processed. This data processing is carried out repeatedly with respect to all the runs LC in such a way that one line is overlapped sequentially. That is, the result obtained by the line-narrowing process of the line $l_i$ corresponds to the line $l_{i-1}$ when the next line $l_{i+1}$ is processed by replacing the line $l_i$ by the line $l_{i+1}$.

Figure 5A:
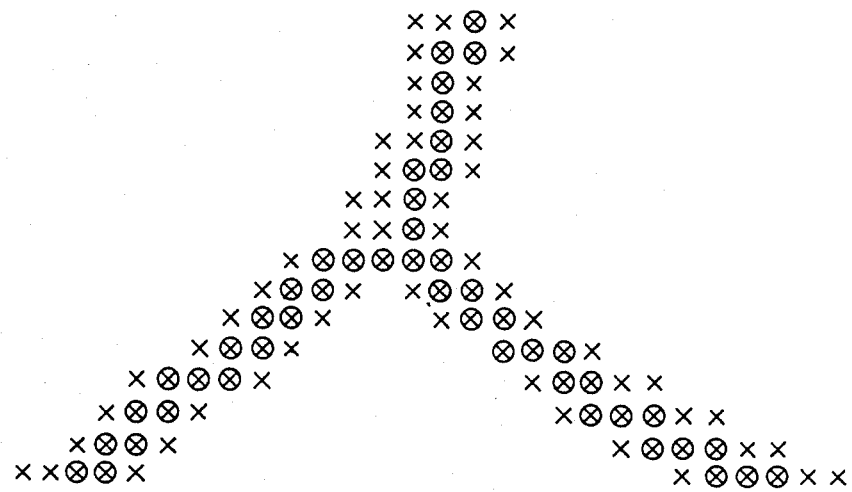
FIG. 5A is an explanatory diagram used to explain one example of X-Y point series data obtained by the narrowing process.

One example of the X-Y point series data obtained by the above-mentioned process is illustrated in FIG. 5A in which X marks indicate the position of the black picture elements in a run and the ⊗ marks indicate the positions of the black picture elements obtained by the line-narrowing process. In this case, W is equal to 9.

FIG. 5B is used to explain the line-narrowing process in a portion adjacent to an intersection of the 9th line in FIG. 5A. In this case, the counter 2B is not processed; that is, the content (a) in the counter 2B is set at an initial value 0. When the processing of ($LB_1$,LC,$LN_1$) under the condition of LC<W in the case of the intermediate portion B shown at (g) in TABLE 1 is carried out, the counter 2B has the content (b). In like manner, when ($LB_1$,LC,$LN_2$) is processed, the counter 2B has the content (c). Here, the symbol * indicates that in the content (b) in the preceding process, the content has already become "1". When the black picture elements at the positions corresponding to the "ON" ("1") positions of the counter content (c) are selected, the black picture elements marked with ⊗ of the run LC are obtained as shown in FIG. 5B.

As described above, in the first embodiment, local regions, each defined by three lines, are processed based on run data representative of a range of the picture element data, so that the system of the present invention can quickly narrow the lines as compared with a case where binary coded picture element data are processed over the whole region of a line pattern.

Figure 6:
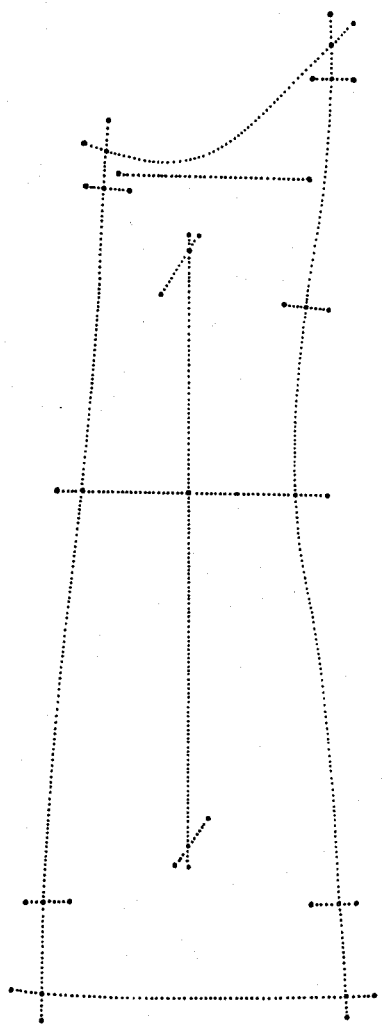
FIG. 6 is an explanatory diagram used to explain a result of the narrowing process in case of the design pattern shown in FIG. 2A.

The result of the line-narrowing process for the design pattern shown in FIG. 2A is shown in FIG. 6. As shown in FIG. 6, the X-Y point series data group defined by the interconnection of a plurality of units having a single picture element is prepared and stored in the RAM 2A.

Next, of the X-Y point series data in which a plurality of units of a single picture element are interconnected, the X-Y data in which a plurality of picture elements are interconnected only in one direction and the X-Y data in which a plurality of picture elements are interconnected in three or more directions are extracted.

Figure 7:
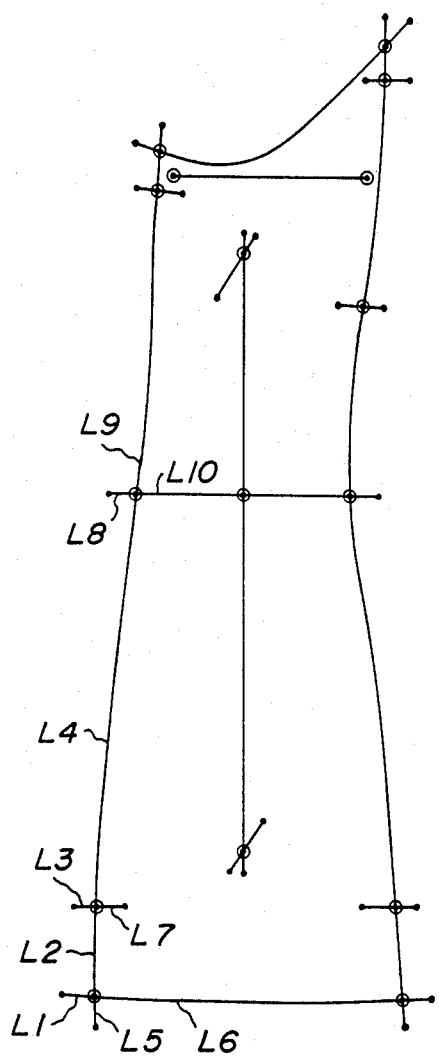
FIG. 7 is an explanatory diagram used to explain feature points.

In FIG. 7, the points indicated by the black dots are feature points representing end points of line data.

The points marked with ⊙ are feature points indicating points of intersection between line data.

As shown in FIG. 7, the X-Y point series data are divided into data between the feature points; that is, line data $L_1, L_2, L_3, L_4, \ldots L_9, L_{10}, \ldots$ Each of the line data consists of X-Y point series data having feature points as a starting point and as an end point. Such line data are assembled to form X-Y point series data in which the starting point, the intermediate point, and the end point are interconnected in the order named and are stored in the RAM 2A.

In the present invention, the segment tracing method can be employed as one of the methods for obtaining a line data having extracted feature points as the starting and end points. For instance, a pattern coding system as disclosed in U.K. Pat. No. 1517869 or corresponding Japanese Patent Application Publication No. 56-46176 may be used. In this method, the X-Y data can be successively registered as line data by tracing the interconnected picture elements, using the picture elements obtained by narrow line processing of three successive lines. In the first embodiment, in addition to the above-mentioned method, restrictions are added that line data must be terminated at a branch point or a joint which is a point of intersection and that a plurality of other line data are started from the same coordinates.

When there exists only one set of line data whose end points coincide with the end points of other line data, the start and end points of the line data always coincide with the end point or point of intersection. Thus, line data extended from one feature point to another feature point can be obtained.

For instance, it is assumed that a line Ln consists of six point series data. Then, $X_1Y_1$ is defined as a start point, while $X_6Y_6$ as an end point, and the line Ln is stored as the data in the form of $$Ln;\ X_1, Y_2 \ldots X_5, Y_6$$
$$X_1, Y_2 \ldots Y_5, Y_6$$

Figure 8:
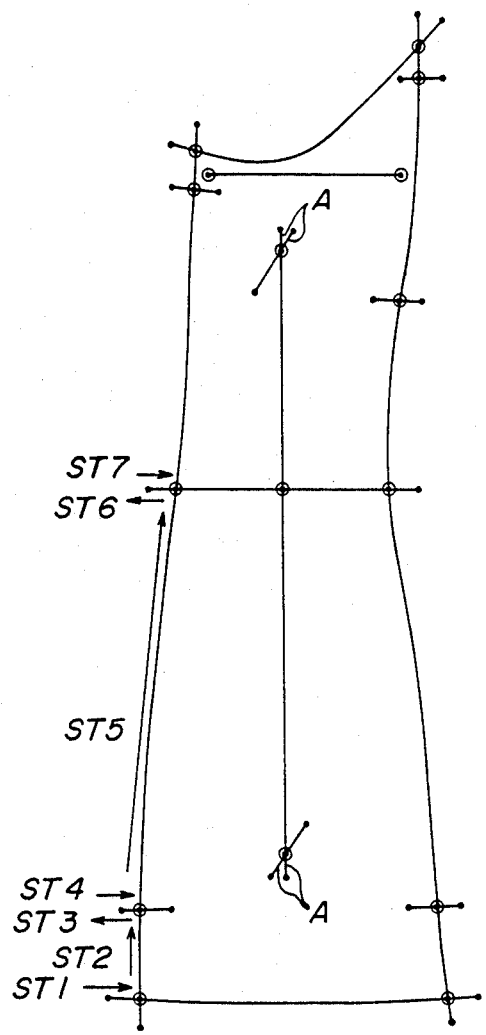
FIG. 8 is an explanatory diagram used to explain a process for tracing the whole profile of a design pattern.
Figure 9:
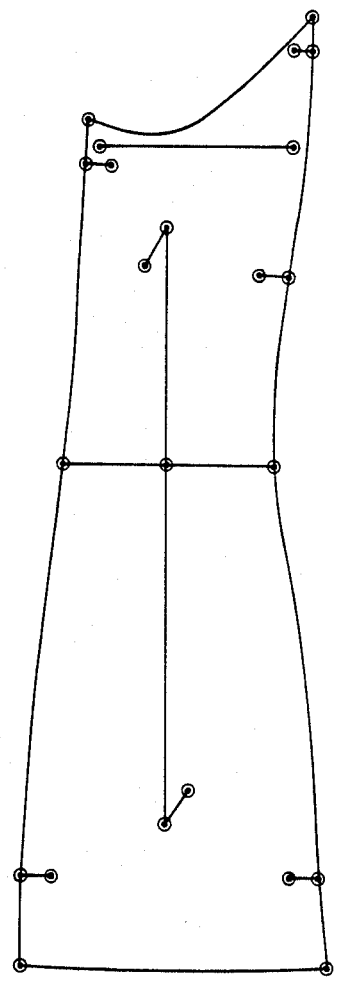
FIG. 9 is an explanatory diagram used to explain pattern data thus processed.

Next, as shown in FIG. 8, tracing is started from the line data $L_1$ having a feature point of which a value X is minimum, and then when the other feature point of the line data $L_1$ is reached, the left most line data among the data line connected to the other end of the line data $L_1$ is traced. When there is no line data to be connected, the line data in question is traced in the reverse direction. In this manner, steps ST1, ST2 and so on are repeated so that the whole outer periphery of the design pattern is traced. For instance, in the steps ST3 and ST4 and in the steps ST6 and ST7, the same line data are successively traced in one direction and then in the other direction. Those line data are removed and as a result the data of the outer profile line of the design pattern is prepared as shown in FIG. 9. In FIG. 9, ⊙ mark indicates a feature point.

After one design pattern data has been processed in the manner described above, design pattern data which are not processed yet are sequentially processed so that the outer profile data of the profile lines of all the design patterns drawn on the sheet of paper are prepared. In this case, the outer profile line data are obtained in the clockwise direction. On the contrary, when the tracing is started from the right most line data, the outer profile line data in the counterclockwise direction can be obtained.

The outer profile line data is converted into X-Y point series data in which the following feature point code is affixed to each line data Ln and then the X-Y point series data is stored in the storage unit 3 as data which are to be processed by CAD.

| LDXn: data arrangement of an index portion of line data Ln | | | | |
|---|---|---|---|---|
| number of data point | line type | start point code | end point code | No. of the next line |
| K | 1 | I, C or N | I, C or N | m |

| LLXn: data arrangement of X of point series data in line data Ln | | |
|---|---|---|
| start point X | intermediate points X | end point X |
| $X_1$ | $X_2, X_3, \ldots$ | $X_k$ |

| LLYn: data arrangement of Y of point series data in line data Ln | | |
|---|---|---|
| start point Y | intermediate points Y | end point Y |
| $Y_1$ | $Y_2, Y_3, \ldots$ | $Y_k$ |

Figure 10A:
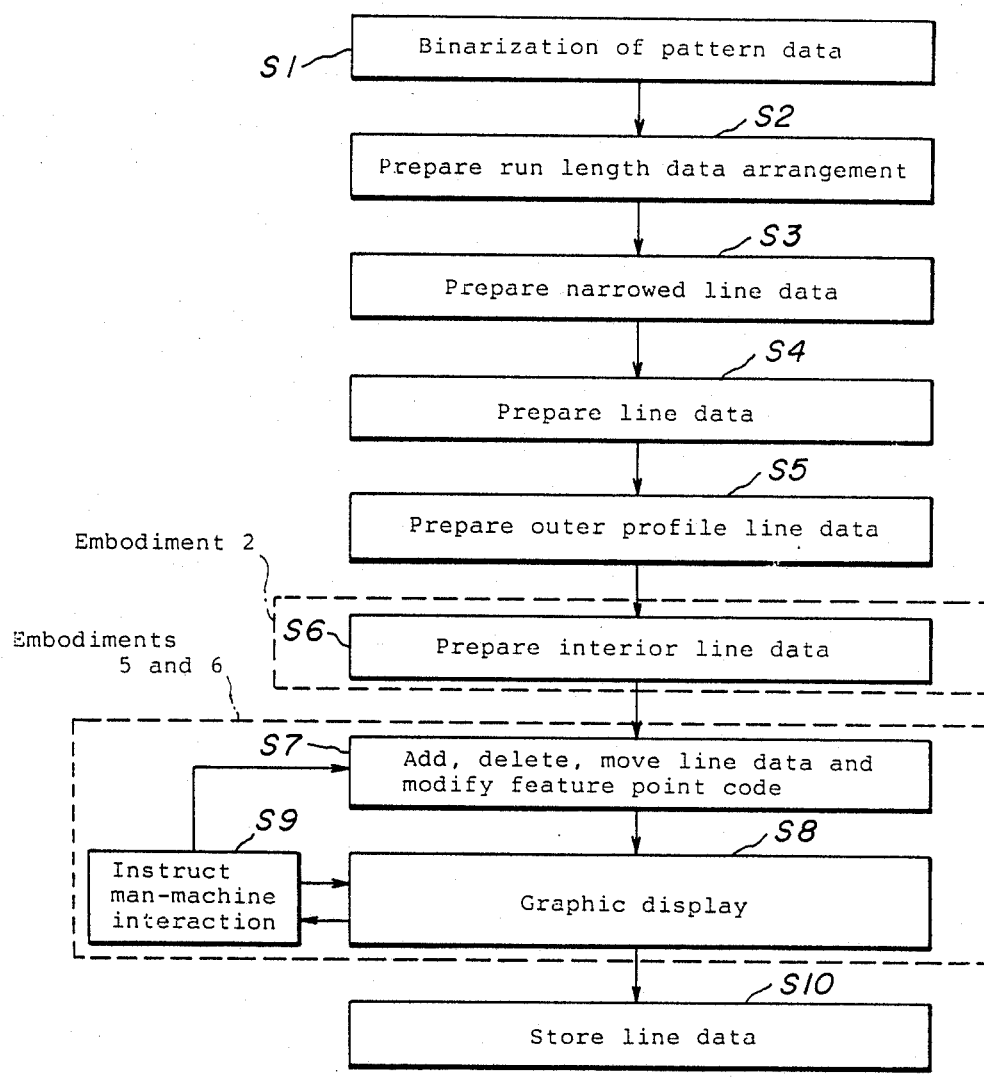
FIG. 10A is a flowchart illustrating one example of a processing procedure of a sheet of paper bearing a design pattern.
Figure 10B:
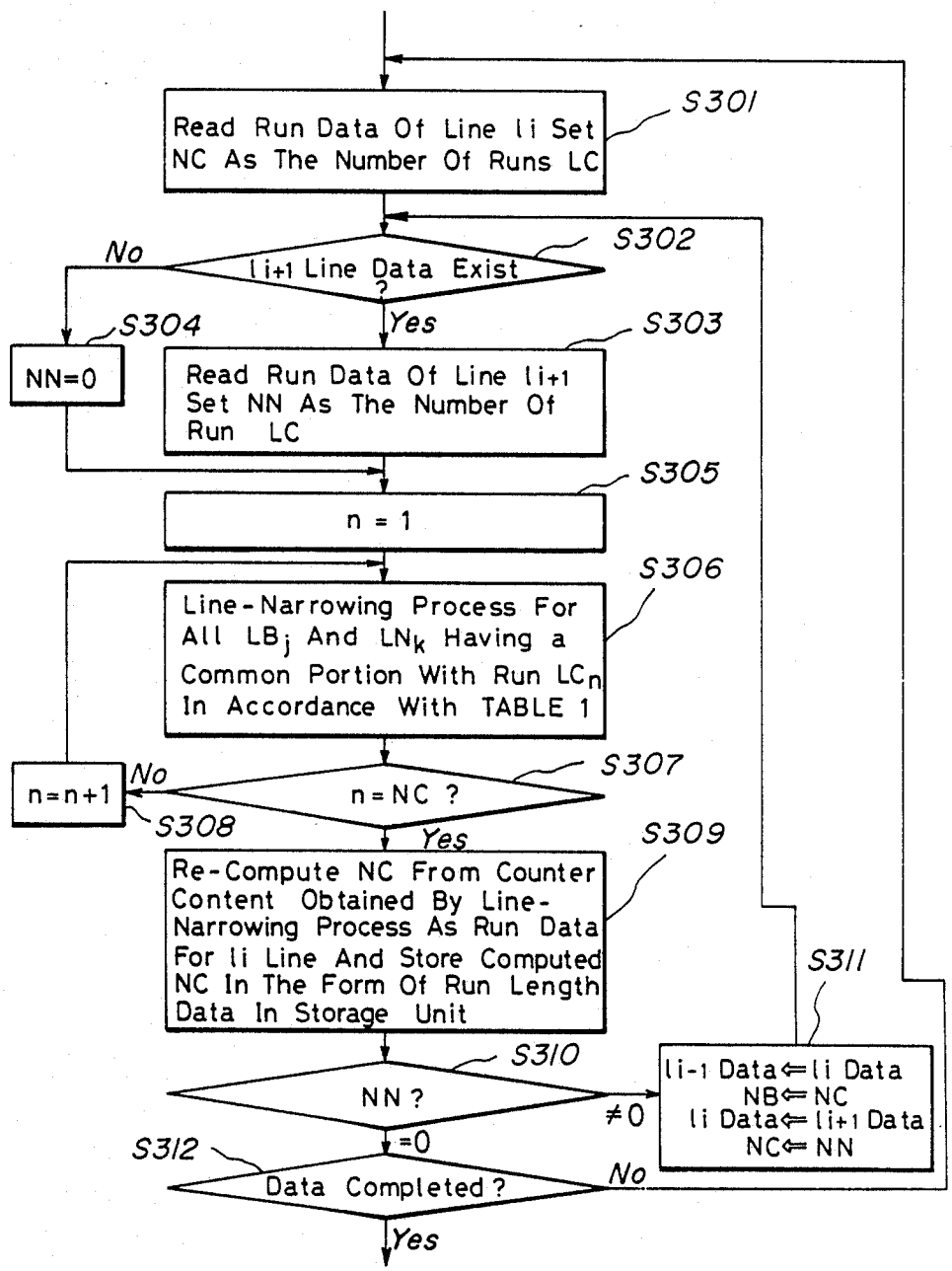
FIG. 10B is a flowchart illustrating one example of a process for narrowing a width of a line.
Figure 10E:
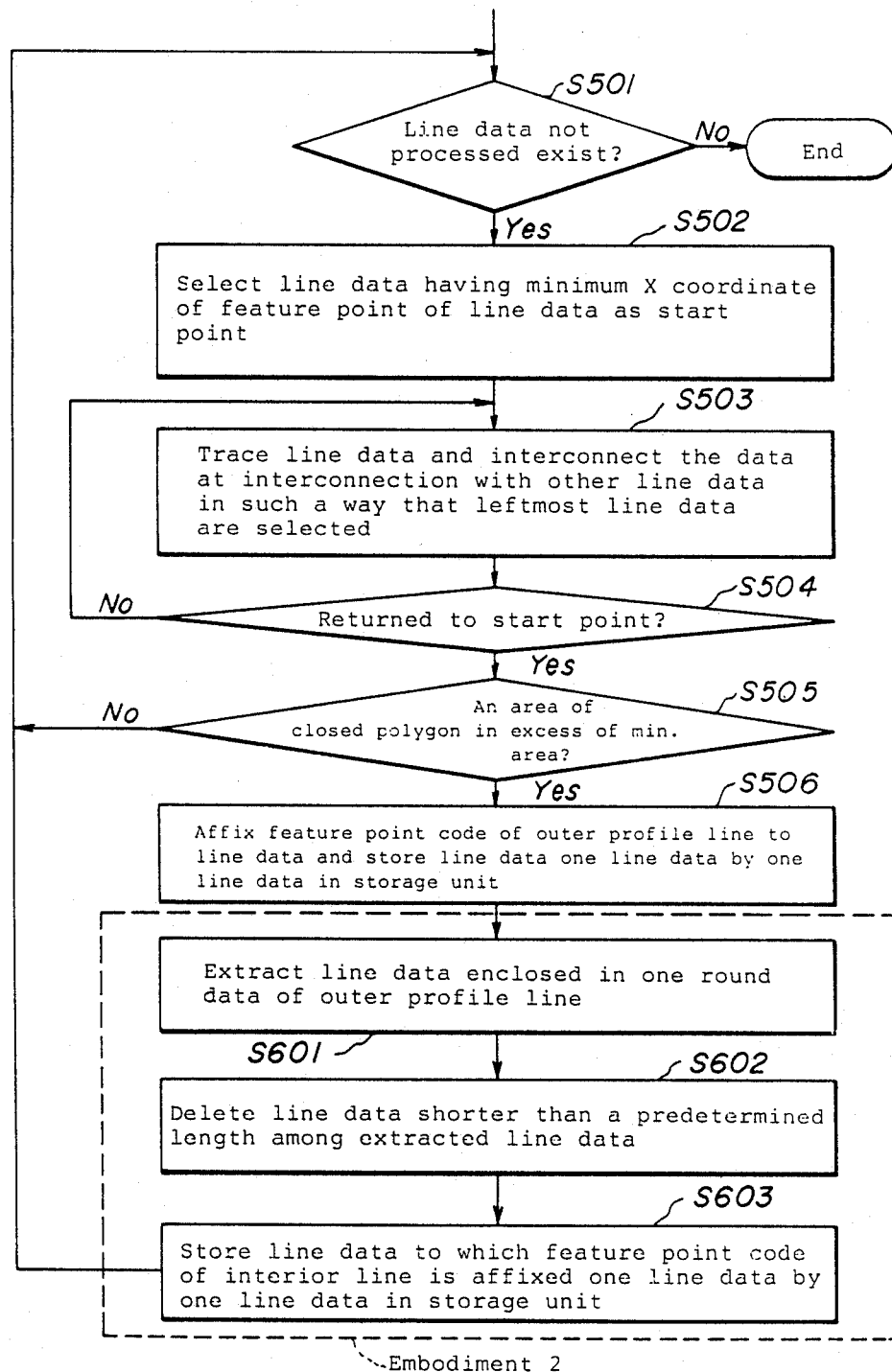
FIG. 10E is a flowchart illustrating a process for preparing an outer profile data and a process for preparing an interior line data.

The number of data point = k: the number of point series data composing the line data
line type: outer profile line = 1, inner profile line = 2
Start and end point codes:
corner = C
intersection with an interior line = I
notch = N FIGS. 10A–10E show one example of a flow chart when data of a drawn design pattern sheet are processed according to the above operation procedure. The flowchart shown in FIG. 10A illustrates outlined steps S1–S10, and the substeps S301–S312 comprising step S3 for carrying out the line-narrowing process are shown in FIG. 10B. The substeps S401–S417 comprising step S4 for preparing line data are shown in FIGS. 10C and 10D. The substeps S501–S506 comprising step S5 for preparing outer profile lines and the substeps S601–S603 comprising the step S6 for preparing interior data lines in a second embodiment to be described below are illustrated in FIG. 10E.

Steps S1–S5, steps S301–S312 and steps S401–S417 shown in FIGS. 10A–10E are self-explanatory from the descriptions in the respective step blocks and from the above-described explanation, so that they are not described further in detail. The remaining steps S6–S10, S501–S506 and S601–S603 will become apparent from the descriptions in the respective step blocks and the process to be explained below.

In this stage, when it is required to reduce the number of X-Y point series data, the method disclosed in Laid Open Japanese Patent Application No. 61-195477 can be used. That is, in each line data, the intermediate points in a suitable section are thinned out, so that the data in the form of a vector is stored in the storage unit 3.

In this case, the line data between the adjacent feature points must be detected whether they represent a straight line or a curved line. For instance, the above-mentioned cone intersection method can be used to detect whether the X-Y point series data between the adjacent feature points is included or not in a cone defined around one feature point. When it is included within the cone, it represents a straight line. When it is not included in the cone, it represents a curved data.

More particularly, when the line data between the feature points indicates a straight line, the X-Y point series data in the section between the feature points, i.e., the X-Y point series data of the intermediate points, is deleted. On the other hand, when the line data between the feature points represents a curved line, the cone intersection method is employed. That is, a cone having a predetermined angle $\pm \theta$ is set with respect to a straight line connecting two points. Then, if a point represented by the next X-Y point series data relative to one feature point is included in the cone, the point preceding that point is deleted, and then a new or modified cone is set by a common portion between that cone for the eliminated point and a subsequent cone having a predetermined angle $\pm \theta$ with respect to the point next to the eliminated point.

On the other hand, when the points are not contained in the cone, the point preceding that point is reserved as a necessary point. As described above, when a certain point is deleted, it is judged in the same procedure as that described above whether or not the succeeding point is contained within the modified cone. On the other hand, when a necessary point is obtained, a further cone is defined from that necessary point in a manner substantially similar to that described above and then it is judged whether or not this point is included in the cone.

Figure 11:
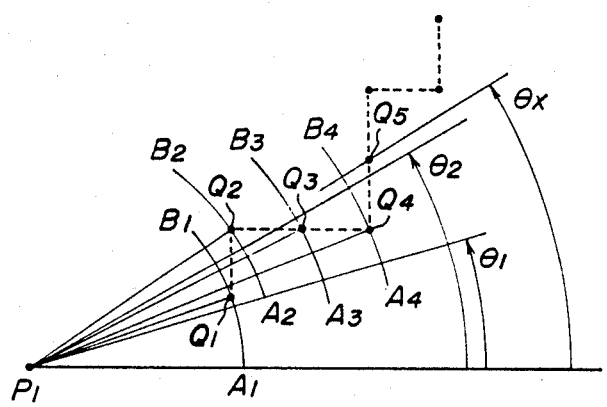
FIG. 11 is an explanatory diagram used to explain a cone intersection method.

Referring next to FIG. 11, a method of judging whether or not each point is included in a predetermined cone will be specifically described. First, an arc having a radius of $P_1Q_1$ is drawn for the succeeding point $Q_1$ around the feature point $P_1$ as a center point. Two points spaced apart by $\epsilon'$ from the point $Q_1$ on the arc are represented by $A_1$ and $B_1$. When an angle of inclination of the straight line $P_1Q_1$ is represented by $\theta$, an angle $\theta_1$ of inclination of the straight line $P_1A_1$ becomes $$\theta_1 = \theta - (\epsilon'/P_1Q_1)$$

and an angle $\theta_2$ of inclination of the straight line $P_1B_1$ becomes $$\theta_2 = \theta - (\epsilon'/P_1Q_1)$$

Next, it is judged whether or not the straight line $P_1Q_2$ for the next point $Q_2$ is included within the cone having a predetermined angle of $(\theta_2 - \theta_1)$. When an angle $\theta_x$ represents an angle of inclination of the straight line $P_1Q_2$ and when the following condition is satisfied $$\theta_1 \leq \theta_x \leq \theta_2,$$

the point $Q_2$ is spaced apart from the straight line $P_1Q_1$ by a distance shorter than $\epsilon'$, so that the point $Q_2$ is regarded as being located approximately on the same line $P_1Q_1$ and consequently the point $Q_1$ can be deleted. In this case, the angles $\theta_1$ and $\theta_2$ are modified according to the following equations:

$$\theta_1 = Max(\theta_1, \theta - (\epsilon'/P_1Q_2))$$

and $$\theta_2 = Min(\theta_2, \theta - (\epsilon'/P_1Q_2))$$

On the other hand, when $\theta_2$ is smaller than $\theta_x$ or $\theta_x$ is smaller than $\theta_1$, the point $Q_1$ is reserved as a necessary point.

In FIG. 11, for the feature point $P_1$, the points $Q_1$, $Q_2$ and $Q_3$ are deleted and the angle $\theta_x$ for the next point $Q_5$ becomes greater than $\theta_2$ ($\theta_2 < \theta_x$) in relation to the angles $\theta_1$ and $\theta_2$ defined for the point $Q_4$, so that the point $Q_4$ is reserved as a necessary point. As a result, in this section, only the line data of the straight line interconnecting the point $P_1$ and the point $P_4$ are stored in the RAM 2A.

Figure 12:
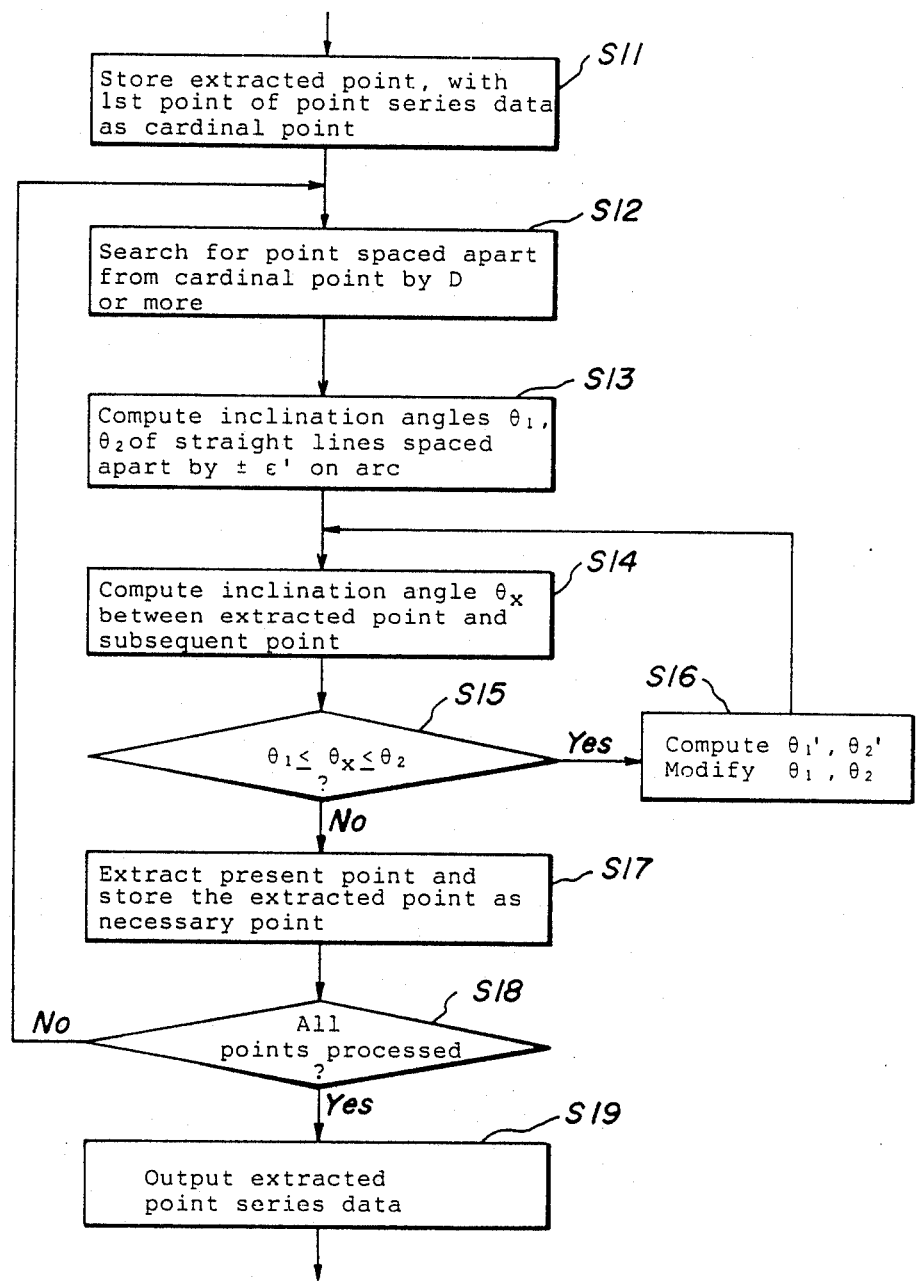
FIG. 12 is a flowchart illustrating a procedure for carrying out the cone intersection method.

One example of a control sequence for obtaining a necessary point by thinning the X-Y point series data by the method described above is shown in FIG. 12.

At step S11, the first feature point in the X-Y point series data is stored as a cardinal point and then at the next step, S12, a point spaced apart from the base point by a distance longer than a predetermined distance D is searched. At step 13, an arc having a radius containing this point is drawn and then angles $\theta_1$ and $\theta_2$ of inclination of lines interconnecting the cardinal point on the one hand and the position located on the arc and spaced apart from the point by $\pm\epsilon'$ on the one hand are measured.

At next step S14, an angle $\theta_x$ of inclination of the straight line interconnecting the point which has been extracted as a necessary point (the cardinal point, here in FIG. 11) and the subsequent point is computed. At step S15, the angles $\theta_x$ is compared with $\theta_1$ and $\theta_2$. When $\theta_1 \leq \theta_x \leq \theta_2$, the procedure goes to step S16. When $\theta_2 < \theta_x$ or $\theta_x < \theta_1$, the procedure goes to step 17.

At step S16, $\theta_1'$ and $\theta_2'$ for the present point for which $\theta_x$ has been computed are calculated and then compared with the previous angles $\theta_1$ and $\theta_2$. Of $\theta_1$ and $\theta_1'$, one having a greater value is defined as a new $\theta_1$, while of the angles $\theta_2$ and $\theta_2'$ the one having a smaller value is defined as $\theta_2$. Thereafter, a next point to be judged is modified, i.e., the further point next to the point in question is treated as a point to be judged subsequently and then the procedure returns to step 14.

At step 17, the present point for which $\theta_x$ has been computed is extracted and stored as a necessary point to be preserved.

At step 18, a decision is made whether or not there exists a point to be processed. When a point to be processed exists, the procedure returns to step S12 so that the same procedure is repeated. When there exists no point to be processed, it is judged that all the points have been processed. Then, the procedure proceeds to step 19 so that the X-Y point series data with respect to the extracted feature and necessary points is outputted.

Further, a degree of accuracy of the feature and intermediate points of the design pattern data obtained in the manner described above is influenced by the line-narrowing method. Therefore, if necessary, data of black picture elements in the form as shown in FIG. 2B, included within a region which has a predetermined area and whose center corresponds to X-Y values of point data concerning a point of intersection, an intermediate point, or an end point in question, are extracted, and then the point data is corrected to correspond to the coordinates of the center portion of the assembly of these extracted black picture elements, whereby the degree of the accuracy can be improved.

The data compression by thinning the intermediate points in this manner enables judgment whether a section between feature points is a straight or curved line according to the existence or non-existence of a necessary point therein. Thus, a curved line portion can be smoothed as a curved line and a straight line portion can be treated as a straight line when a design pattern is outputted, so that a preferable pattern is displayed on the display unit 4.

Embodiment 2:

In the second embodiment of the present invention, line data contained within the one-round outer profile line of the design pattern, that is one complete trace of the outer profile line, which are read out and processed in steps S501–S506 in the first embodiment are judged as the data of the interior lines of the design pattern and then extracted (step S601). Next, at step S602, of the extracted line data, the line data shorter than a predetermined length such as an extremely short line segment indicated by A in FIG. 8 is judged as noise or a specific mark indicating a feature point and then deleted, so that the interior lines as shown in FIG. 9 are obtained. In FIG. 9, the ⊙ mark indicates a feature point. Next, the procedure proceeds to step S603 so that the interior line data are formed as X-Y point series data in which feature point codes are added to the start and end points of the line data between two feature points and are stored in the storage unit 3 in the same form as the data arrangement in case of the outer profile line described above.

In this case, unlike the first embodiment, the following feature point codes for the interior lines are used:

an intersection with the outer profile line = J
end point = T
an intersection between the interior lines = G More particularly,

| LDXn: data arrangement of an index portion of line data Ln | | | | |
|---|---|---|---|---|
| number of data point | line type | start point code | end point code | No. of the next line |
| K | 2 | J, T or G | J, T or G | m |

| LLXn: data arrangement of X of point series data in line data Ln | | |
|---|---|---|
| start point X | intermediate points X | end point X |
| $X_1$ | $X_2, X_3, \ldots$ | $X_k$ |

| LLYn: data arrangement of Y of point series data in line data Ln | | |
|---|---|---|
| start point Y | intermediate points Y | end point Y |
| $Y_1$ | $Y_2, Y_3, \ldots$ | $Y_k$ |

The number of data point = k: the number of point series data composing the line data
line type: outer profile line = 1, inner profile line = 2
Start and end point codes:
intersection with an outer profile line = J
end point = T
intersection between interior lines = G In the case of the feature point code J, the feature point code of the outer profile line having the same coordinates is judged from a length, profile, and so on of an interior line to change the corresponding feature point code of the outer profile line to I or N.

Embodiment 3:

The third embodiment of the present invention will be described in the case of a paper pattern for clothing used in the apparel industry. That is, a design pattern for clothing is cut along the outer profile lines into a sheet-like pattern piece (hereinafter referred to as a "paper pattern"). Paper pattern data obtained from the paper pattern are represented by the coordinates so that data is obtained for input into a CAD system.

The feature points of a paper pattern for clothing include a corner, a point at which line configurations change (for instance, a boundary point between straight and curved lines), a notch, an intersection between an outer profile line and an interior line, and an intersection between interior lines. When paper pattern data are inputted into the computer 2, pattern processing such as an increase or decrease in size, the allocation of seam allowance, and changes in shape or pattern is carried out. In case of outputting a smooth, curved line by an interpolation method, such as a smooth method by utilizing automatic drafting apparatus of the like, feature points can be used as end points of a section which undergoes the smoothing process.

A paper pattern is read by a scanner that is generally used as the image reader 1. Usually, a paper pattern is cut out from a sheet of white or almost white paper. With this in view, in the case of reading the paper pattern, a black background is used for the scanner. That is, a black roller or a black flat plate cover which is remarkably different in brightness from the paper pattern is used. Alternatively, a paper pattern is placed on a black sheet, sandwiched between transparent film covers, and then loaded into the scanner for reading.

The paper pattern is scanned line by line by the scanner, so that the black background and the white paper pattern are digitized according to the brightness level between the background and the pattern to form data expressed in units of picture elements.

Figure 13A:
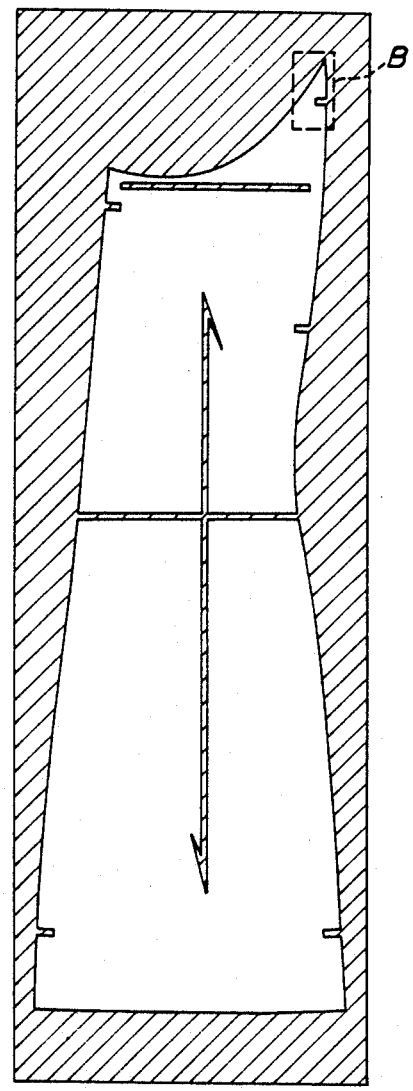
FIG. 13A is an explanatory diagram used to explain a pattern cutout.
Figure 13B:
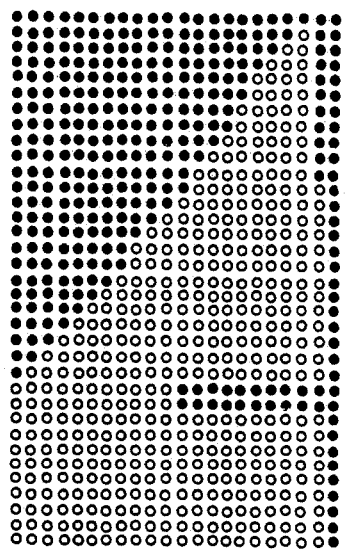
FIG. 13B is an explanatory diagram used to explain one portion of the binary coded data thereof.

The digital picture element data is converted into two values corresponding to white and black picture elements at a suitable threshold level. For instance, the portion B in FIG. 13A, as shown on an enlarged scale in FIG. 13B, shows the point data consisting of the white picture elements (indicated by white dots) surrounded by the black picture elements (indicated by black dots).

Here, the profile picture elements at the boundary between the white and black dots are interconnected with a unit of one picture element in a manner to be described in detail hereinafter with reference to FIGS. 14, 15A, 15B, 15C and 15D.

Figure 14:
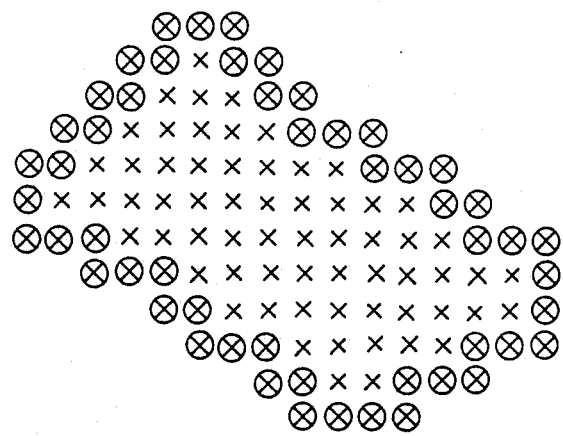
FIG. 14 is an explanatory diagram used to explain picture elements of an outer profile.

As shown in FIG. 14, when one or more picture elements exist adjacent to a picture element in one or more directions of the four main directions (upper, lower, left and right) of the picture element, it is defined that the picture elements are interconnected with each other. The process for defining boundary interconnection of picture elements by extracting specific picture elements is called the preparation of profile picture elements. In FIG. 14, an X mark indicates the white picture elements, while a ⊗ mark indicates a profile picture element. In this case, it is possible to interconnect the picture elements in eight directions; that is, the above-mentioned four main directions plus four inclined directions, but the present invention will be described in case of the extraction of the picture elements in only the four main directions.

In the above-mentioned method for extracting profile picture elements, use is made of a scanner having a resolution that is sufficient to detect a line width or a variation in shape of the paper pattern. A run among three lines $l_{i-1}$, $l_i$, and $l_{i+1}$, which are sequentially scanned in the main scanning direction (Y-direction) by the scanner; that is, an interconnection relationship of successive black picture elements is judged, so that profile elements are extracted as run units with respect to the center line $l_i$.

Various methods for obtaining data of two successive lines by a scanner have been proposed. (For instance, U.S. Pat. No. 4,183,013 entitled "System for Extracting Shape Features from an Image"). In contrast, in the present invention, in order to attain high-speed processing, the extraction of profile picture elements is carried out only line by line and the extracted picture elements are outputted in the sub-scanning direction, so that, in order to facilitate the succeeding preparation of line data, the three successive lines are compared to extract the profile picture elements with respect to the center line, as will be described in more detail below.

When runs of the line $l_{i-1}$ are represented by $LB_1$, $LB_2$, ..., and LBn; one of the runs of the line $l_i$ from which profile picture elements are to be extracted is represented by LC; and the runs of the line $l_{i+1}$ from which profile picture elements are to be successively extracted are represented by $LN_1$, $LN_2$ ..., and LNm. Then, the run LC is classified into four patterns as shown in FIGS. 15A–15D in accordance with the interconnection mode between the runs $LB_j$ (j=1, - - -, n) and LNk (k=1, - - -, m) to be sequentially interconnected in the sub-scanning direction.

Figure 15A:
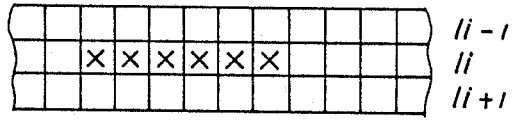
FIGS. 15A-15D are explanatory diagrams used to explain various types of run LC in the process for extracting picture elements in an outer profile.

(a) Isolated portion (FIG. 15A)

In this case, there exists no $LB_j$ and $LN_k$ with respect to the LC. The isolated portion represents dust or noise, so that no profile picture elements are extracted from the line $l_i$.

Figure 15B:
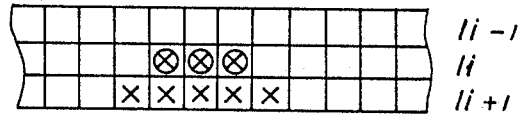

(b) Start portion (FIG. 15B)

There exists no $LB_j$, but exists $LN_k$ with respect to LC.

Figure 15C:
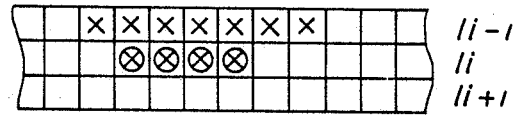

(c) End portion (FIG. 15C)

In this case, there exists no $LN_k$ but exists $LB_j$ with respect to LC.

The start and end portions are the start and end points of a line segment corresponding to the end portions of the portions of the paper pattern which are in parallel with the main scanning direction, so that all the picture elements in both portions of the run LC are extracted as profile picture elements.

Figure 15D:
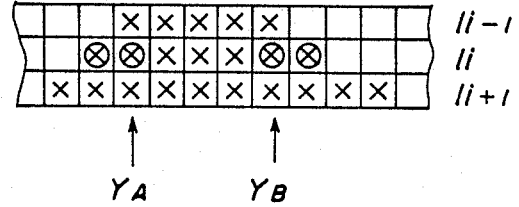

(d) Intermediate portion (FIG. 15D)

In this case, there exist both $LB_j$ and $LN_k$ with respect to LC.

In the intermediate portion, the portion in which the run LC overlaps the positions of $LB_j$ and $LN_k$ in the main scanning direction is referred to as a common portion. When the left end of the common portion is represented by $Y_A$, and the right end thereof is represented by $Y_B$, the white picture elements from the white picture element at the left end of the run LC to the position of $Y_A$, and the white picture elements from the white picture element at the position of $Y_B$ to the right end of the run LC are extracted as the profile picture elements.

In case of the run LC interconnected with a plurality of $LB_j$ or $LN_k$, for instance, as shown in FIG. 15E, all the combinations of ($LB_1$, LC, $LN_1$) and ($LB_1$, LC, $LN_2$) are processed and the soft counter 2B, having an initial value 0, is used to accumulate the length of the run LC, and a computation is performed in such a way that the content of the counter 2B at the position to be selected as a profile picture element is incremented by "1" for each picture element. Thereafter, the picture elements in the run LC corresponding to the maximum value of the counter 2B are extracted as the profile picture elements.

In the example of FIG. 15E, the content (a) of the counter 2B in its initial state is (0, . . . 0). In the content (b) of the counter 2B obtained by by processing of ($LB_1$, LC, $LN_1$), "1" appears at positions selected as profile picture elements. Next, when ($LB_1$, LC, $LN_2$) is processed, "1" is added to the contents of the counter stages at the selected positions in the content (c) of the counter 2B. In this case, the maximum count value is "2", so that the picture elements corresponding to the positions of the maximum count value are extracted as the profile picture elements of the run LC.

In case that a plurality of runs $LB_j$ and a plurality of runs $LN_k$ exist, all combinations are also processed in the manner described above, so that the profile picture elements for the run LC are extracted. In FIG. 15E, the extracted profile picture elements are indicated by mark $\otimes$.

The results of the process carried out in the manner described above are stored as the X-Y point series data group in which the position of the profile picture elements in the sub-scanning direction is represented by a value X and the position in the main scanning direction is represented by the value Y. This processing is carried out for all the runs LC of the $l_i$ line in such a way that the $l_i$ line advances to the $l_{i-1}$ line and the $l_{i-1}$ line advances to the line $l_i$. That is, each line is sequentially moved up by one line so that the processing of each consecutive three lines is repeated.

In case of the above-described comparison of each run in three sequential lines, it may happen that a digital error be caused at both the ends of run LC in one line obtained by binarization of a design pattern. As a result, a boundary formed by the ends of sequential lines which should have been aligned vertically like a straight line, may exhibit a zig-zag or uneven boundary. The above extraction processing of profile picture elements can be performed with deleting such picture elements which otherwise cause uneven boundary due to a digital error, if necessary.

Figure 16A:
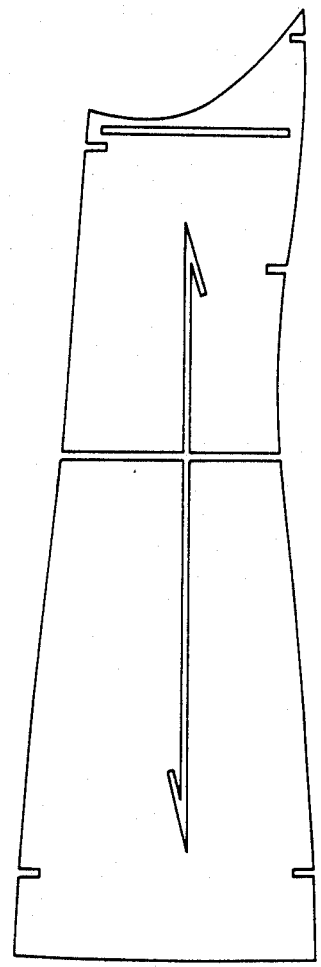
FIG. 16A is an explanatory diagram used to explain formation of an outer profile.

Next, as one of the methods for defining the profile line from the X-Y point series data group of the profile picture elements, the segment tracing method (for instance, as disclosed in Japanese patent application Publication No. 56-46176) can be used. More specifically, use is made of the method for tracing picture elements by utilizing the interconnected picture elements of three successive lines and for sequentially storing the X-Y data as line data. After the preparation of the line data of the profile line has been accomplished, the line data obtained are combined with each other along the profile line in a predetermined direction, so that the profile line as shown in FIG. 16A is formed.

Figure 16B:
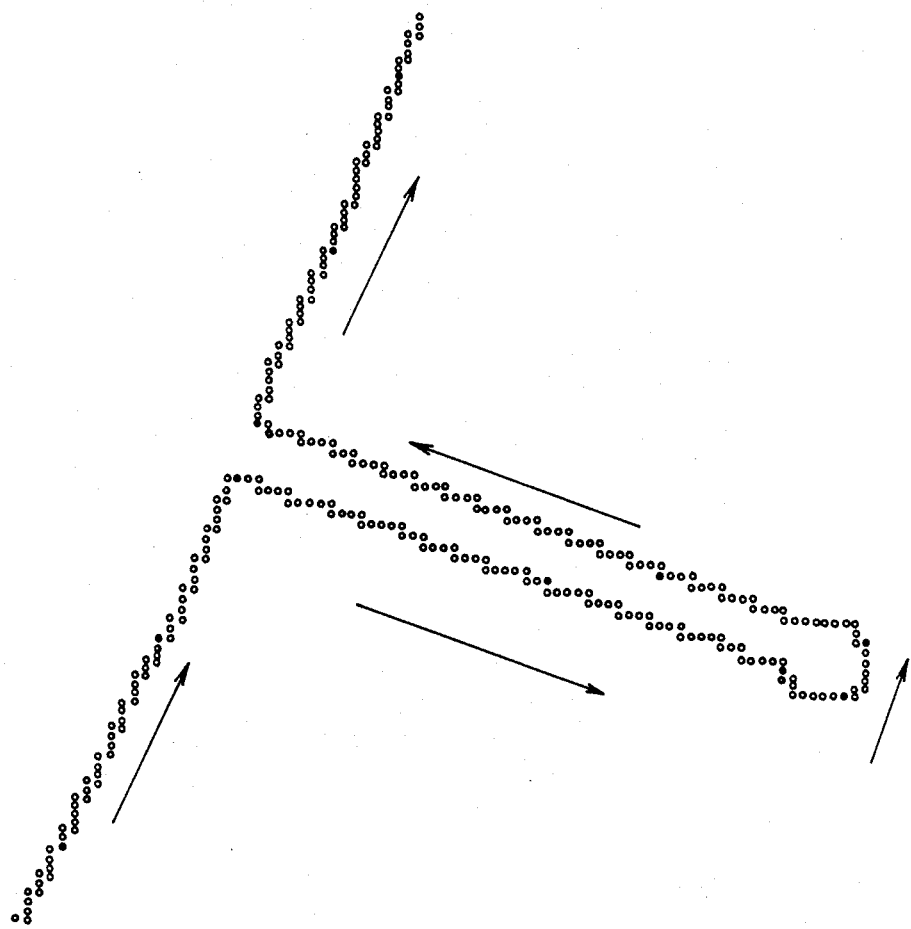
FIG. 16B is an explanatory diagram used to explain feature points on an outer profile line.

As shown in FIG. 16B, a series of X-Y points are interconnected one picture element by one picture element as a unit, so that a position of a feature point for such profile line cannot be judged. In order to recognize the feature point, a conventional method such as the cone intersection method disclosed in the above-mentioned Japanese Laid-Open patent application No. 61-195477 can be used to thin the X-Y point series data so as to extract only necessary points. Then, only the points indicated by the black dots in FIG. 16B remain. In FIG. 16B, long arrows indicate a direction in which one round data of the profile line is moved.

Figure 16C:
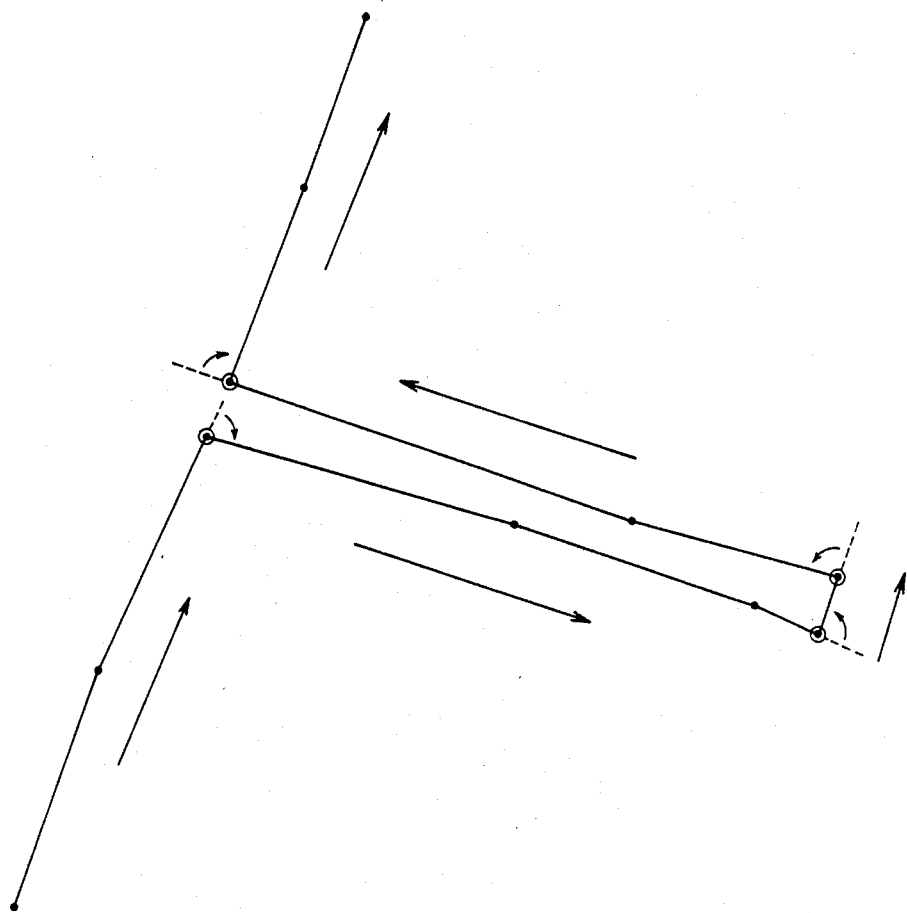
FIG. 16C is an explanatory diagram used to explain extracted feature points.

Next, when an angle formed by vectors interconnecting the black dot points is in excess of a predetermined angle or when an angle variation between the successive vectors is in excess of another predetermined value, these block dot points are regarded as corners of a paper pattern and defined as feature points, which is indicated by ⊙ in FIG. 16C.

The feature points are extracted in the manner described above, and a section between the adjacent feature points is defined as line data. Thereafter, X-Y point series data arranged by interconnecting the start point, the intermediate point and the end point in each line data are stored in the RAM 2A.

In this stage, when it is required to reduce the number of the X-Y point series data, the data that is left after the extraction by the above-mentioned cone intersection method can be used as an intermediate point of line data.

Figure 17:
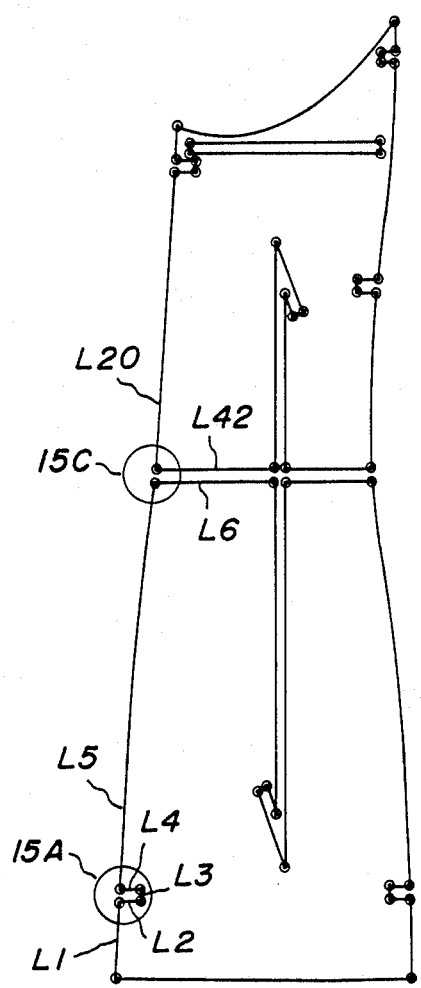
FIG. 17 is an explanatory diagram used to explain line data obtained.

The line data thus obtained are shown in FIG. 17, in which the feature points are indicated by the mark ⊙ and $L_1$, $L_2$, $L_3$, - - - , denote the line data. The start and end points of each line data are the feature points.

In the case of tracing along the whole profile line in the clockwise direction, the profile line shown in FIG. 17 is traced one data line by one data line. When the tracing reaches a cutout portion 15A which corresponds to a notch in the paper pattern, the feature points are interconnected as shown, on enlarged scale, in FIGS. 18A and 18B. More specifically, when an angle $\theta$ formed by the intersection of the line data $L_1$ and $L_2$ is in excess of a predetermined angle, a predetermined judging area JA is defined to include the line extended from the line data $L_1$. When the start point of the other data line $L_5$ exists in the judging area JA, the line data $L_1$ and $L_5$ are interconnected. In FIG. 18A, the midpoint MP of the section between the end point of the data line $L_1$ and the start point of the line data $L_5$; that is, the interconnected portion is defined as a feature point. As shown in FIG. 18B, the end point of the line data $L_1$ and the start point of the line data $L_5$ are moved to the point MP, while the start point of the line data $L_2$ and the end point of the line data $L_4$ are also moved to the point MP, so that the cutout portion is interconnected.

The feature point MP corresponds to a notch point of a paper pattern or a point at which an interior line whose one end is extended to the outer profile line intersects the outer profile line.

Furthermore, the portion 15C (FIG. 17) in which a plurality of branches of a profile line are located adjacent to each other is processed in a manner substantially similar to that described above. More specifically, when an angle formed by the intersection of the line data $L_5$ and $L_6$ as shown in FIG. 18C is in excess of a predetermined angle, a predetermined judging area JA including the line extended from the line data $L_5$ is searched. When the start point of the line data $L_{20}$ is located in the judging area JA, a feature point CP is defined at the mid-point between the end point $L_5$ and the start point of the line data $L_{20}$. Thereafter, the end points of the line data $L_5$ and $L_{42}$ and the start points $L_6$ and $L_{20}$ are redefined to coincide with the feature point CP, so that the interconnection of data of the profile line are accomplished.

This feature point CP corresponds to a point at which an end of an interior line intersects the outer profile line.

Figures 19A, 19B:
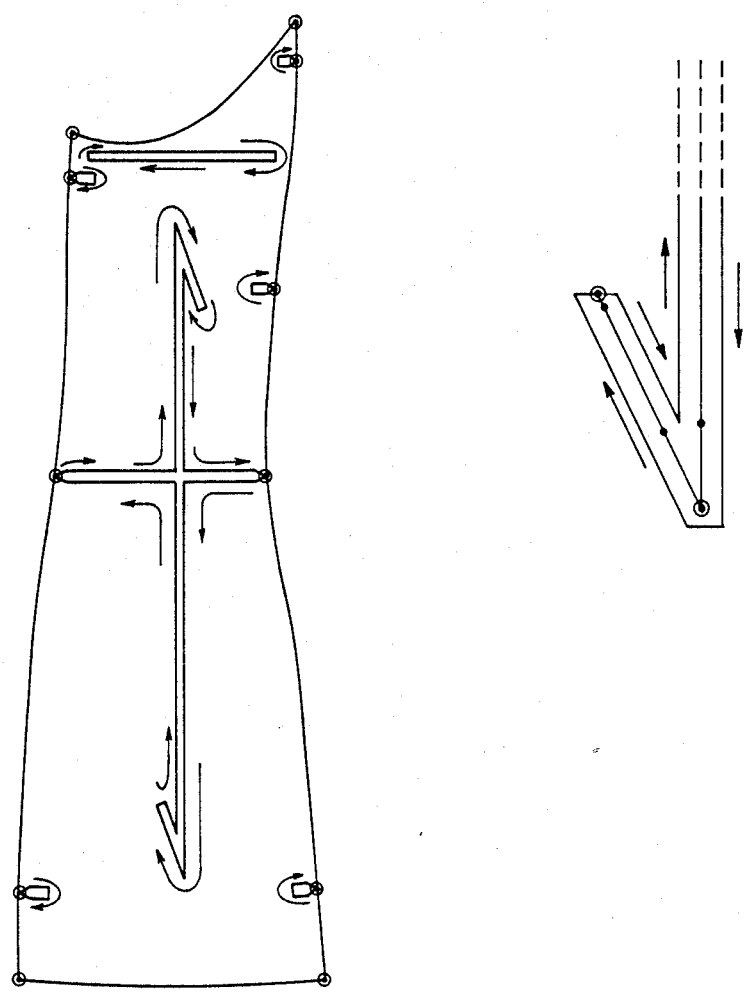
FIG. 19A is an explanatory diagram used to explain data of an outer profile portion.
FIG. 19B is an explanatory diagram used to explain the processing of an inner profile data.

When the above-mentioned process is carried out along the whole circumference of the line data shown in FIG. 17, the outer profile data as shown in FIG. 19A is obtained.

After the data for one design pattern have been processed in the manner described above, the pattern data not processed yet are also processed sequentially in a manner substantially similar to that described above, so that the outer profile line data of all the inputted design patterns are prepared.

Thereafter, X-Y point series data in which the following feature point codes are affixed to the respective line data of the profile are prepared and stored in the storage unit 3 as data which can be used in CAD or the like. In this embodiment, a feature point code N is affixed to the end point of the line $L_1$ and the start point of the line $L_5$ as shown in FIG. 18B, and a feature point code I is affixed to the end point of the line $L_5$ and the start point of the line $L_{20}$ as shown in FIG. 18D.

| LDXn: data arrangement of an index portion of the line data Ln | | | | |
|---|---|---|---|---|
| number of data points | line type | start point code | end point code | No. of the next line |
| K | 1 | I, C or N | I, C or N | m |
| LLXn: data arrangement of X of point series data of line data Ln | | | | |
| start point X | | intermediate points X | | end point X |
| $X_1$ | | $X_2, X_3, \ldots$ | | $X_k$ |
| LLYn: data arrangement Y of point series data of line data Ln | | | | |
| start point Y | | intermediate points Y | | end point Y |
| $Y_1$ | | $Y_2, Y_3, \ldots$ | | $Y_k$ |

Figure 20A:
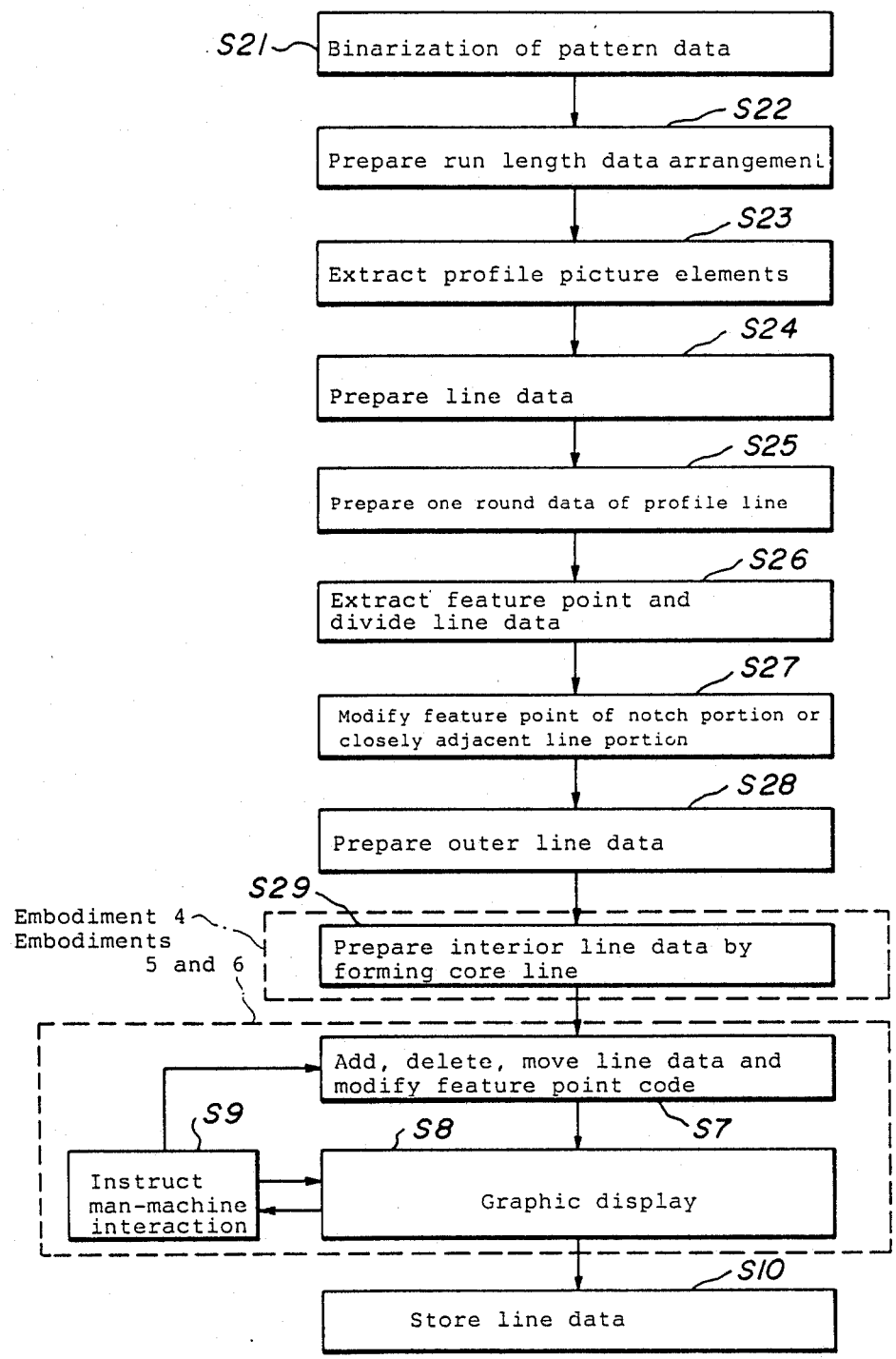
FIG. 20A is a flowchart illustrating one example of a procedure for processing a pattern cutout.
Figure 20B:
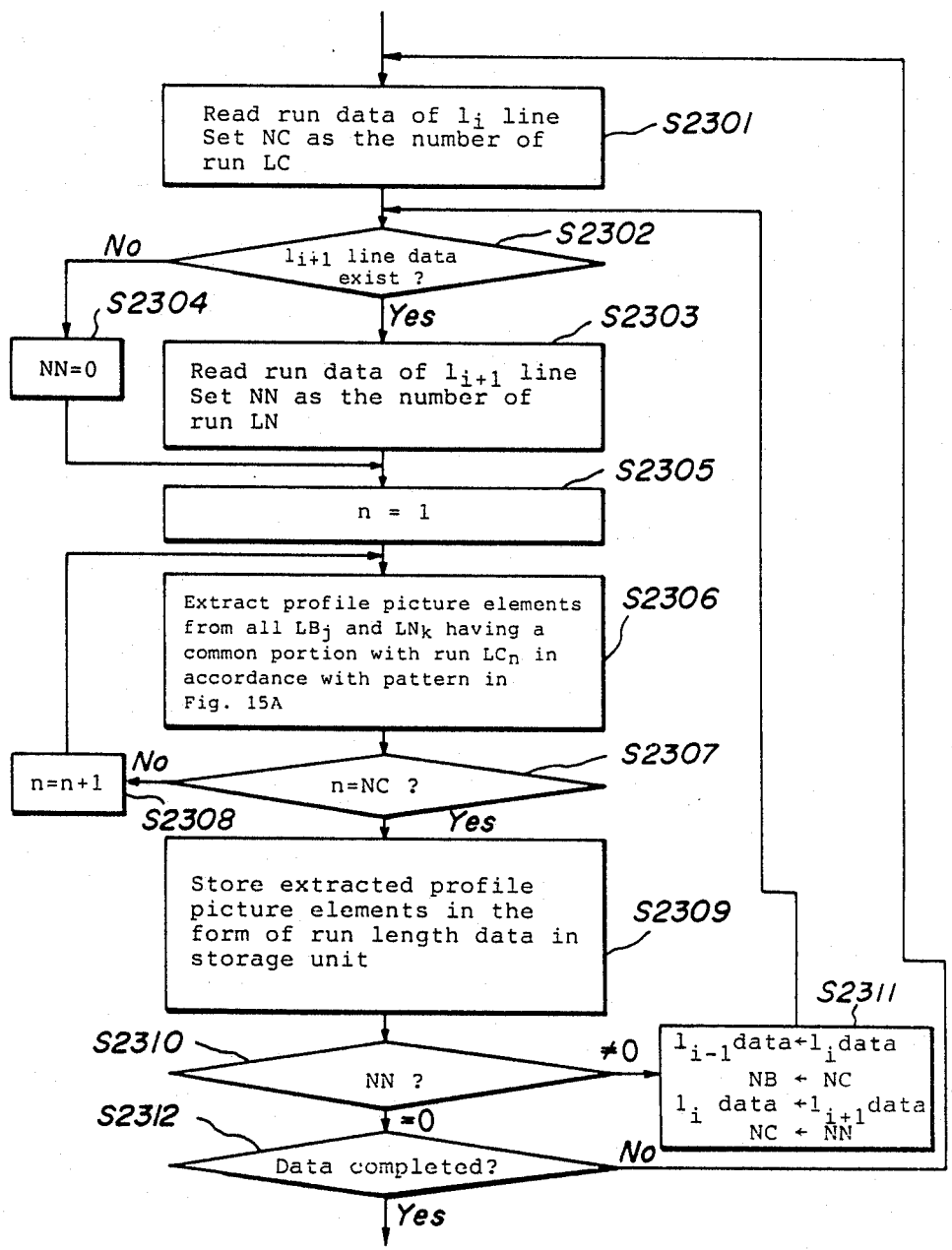
FIG. 20B is a flowchart illustrating one example of a process for preparing picture elements of an outer profile.
Figure 20C:
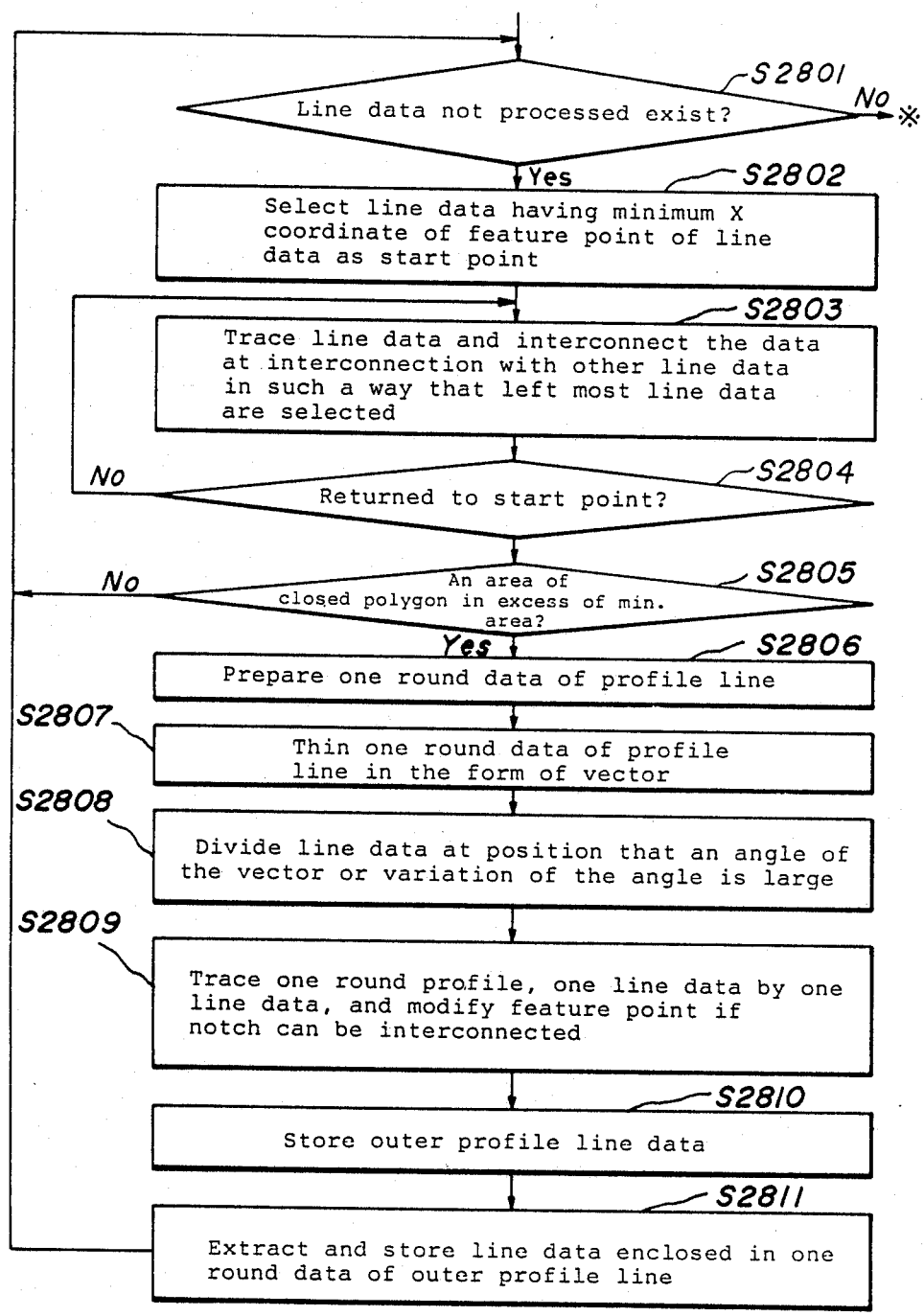
FIGS. 20C and 20D are flowcharts illustrating, in combination, a process for preparing outer profile data of a pattern cutout and a process for preparing inner profile data.
Figure 20D:
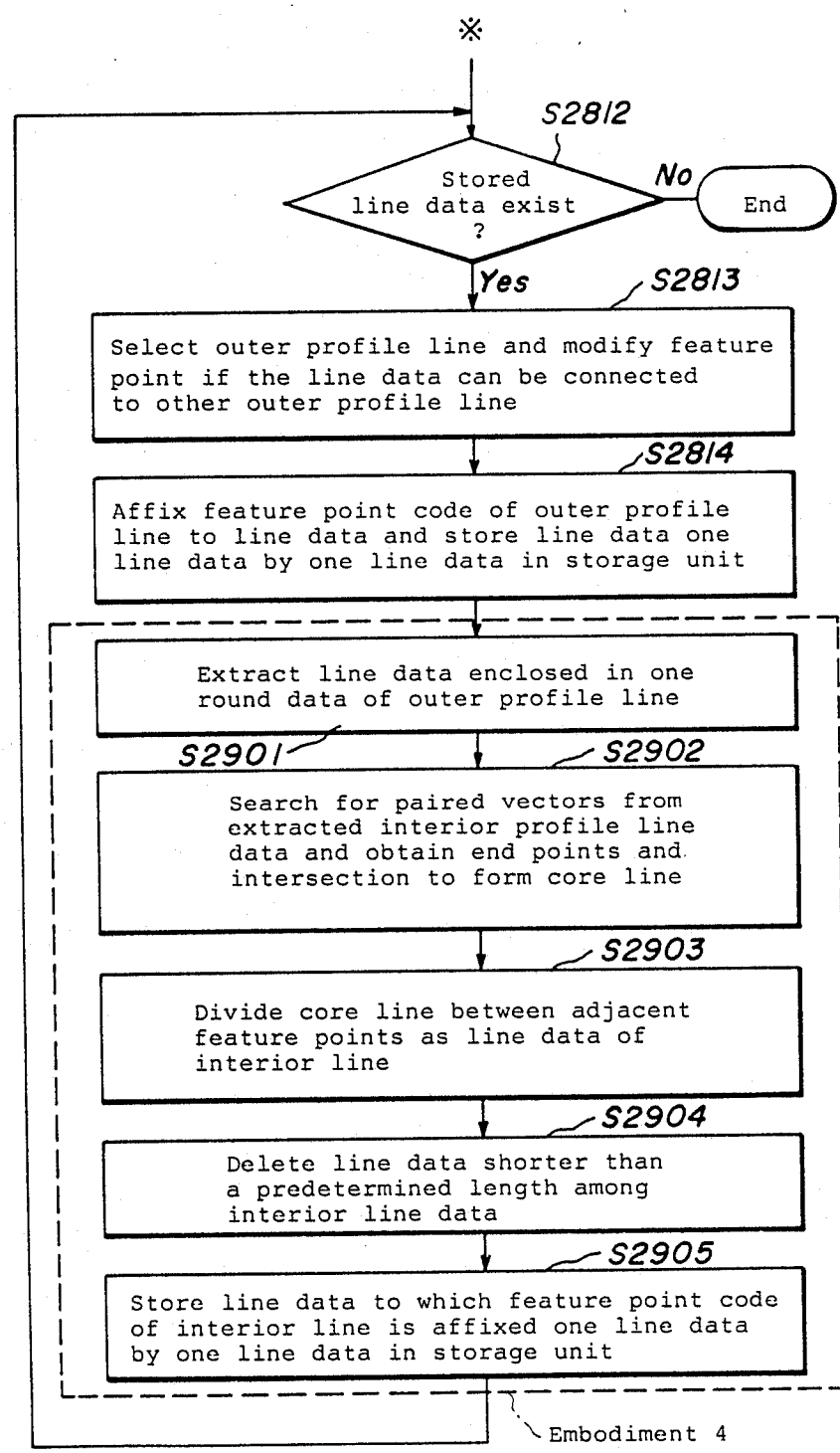

The number of data points = K: the number of series data composing line data
Line type:
outer profile line = 1
inner profile line = 2
Start and end point codes:
corner = C,
intersection with an interior line = I
notch = N An outline of the above-mentioned processing procedure is shown at steps S21–S28 in the flowchart shown in FIG. 20A. A series of substeps S2901–S2905 are shown in FIGS. 20C and 20D. First, at step S2901, the line data contained in the one round data (complete trace) of the outer profile are extracted and then are interconnected in, for instance, clockwise direction by one round so that a plurality of closed line data indicated by the arrows in FIG. 19A are obtained inside the outer profile line. These line data represent outer profile of a line drawn inside the paper pattern, a fine notch cut into the outer profile, a short line that represents a notch and is extended to the outer profile, and so on.

At step S2902, vectors which make a pair are searched from the inner profile line data and then their end points and the point of intersection are searched to define a core line. In order to prepare line data from a profile line, that is, from the inner profile data, a method for carrying out the processing corresponding to the line narrowing method by utilizing the vector data of an outer profile line may be employed. This method is disclosed in "Picture Processing Using Multi-Dimensional Data Management Structure-Vectorization of Drawings", the Transactions of the Institute of Electronics and Communication Engineers of JAPAN, Vol. J68-D, No. 4. More particularly, of the inner profile line data, a pair of vectors are extracted which extend in the opposite directions and are spaced apart from each other by a small distance.

Next, the intermediate point between the pair of vectors is obtained and then line data are obtained by interconnecting the intermediate point indicated by black dot in FIG. 17B. Next, it is determined whether the ends of the line data are located adjacent to the intersection point of the drawn lines or proximate the end points. When the ends of the line data are found to be located adjacent to the point of intersection, the line data is extended to obtain a point of intersection. On the other hand, when the ends of the line data are found to be located adjacent to the ends of the drawn lines, the point of intersection between an extended line of the line data and the profile line is defined as the end point of the line data. In this manner, the points marked by ⊙ in FIG. 19B are defined as feature points.

At step S2903, of the new lines thus formed, that is, of the core lines, the section between the adjacent feature points is defined as line data and the X-Y point series data in which the start point, the intermediate point and the end point of each line data are interconnected is determined to be the line data of the interior line.

At step S2904, of the line data thus obtained, line segment data having a length shorter than a predetermined length is deleted as noise.

At step S2905, the inner profile line data thus obtained is converted into the X-Y point series data in which the feature point codes are affixed to the start and end points of the line data in each paper pattern and then are stored in the storage unit 3 one line data by one line data in the same form as the above-mentioned data arrangement.

Unlike the third embodiment, the following feature point codes are used for the inner profile lines:
a point of intersection with an outer profile = J
an end point = T
a point of intersection of interior lines = G
More, particularly,

| LDXn: data arrangement of an index portion of the line data LN | | | | |
|---|---|---|---|---|
| number of data points | line type | start point code | end point code | No. of the next line |
| K | 2 | J, T or G | J, T or G | m |

| LLXn: data arrangement of X of point series data of line data Ln | | |
|---|---|---|
| start point X | intermediate points X | end point X |
| $X_1$ | $X_2, X_3, \ldots$ | $X_k$ |

| LLYn: data arrangement Y of point series data of line data Ln | | |
|---|---|---|
| start point Y | intermediate points Y | end point Y |
| $Y_1$ | $Y_2, Y_3, \ldots$ | $Y_k$ |

The number of data points = K: the number of series data composing line data
Line type:
outer profile line = 1
interior profile line = 2
Start and end point codes:
intersection with an outer line = J
the end points = T
intersection between interior lines = G In the case of the feature point code J, the feature point code of the outer profile line having the same coordinates is judged from a length, a shape, and so on, of an interior line to change the corresponding feature point code of the outer profile line to I or N.

Figure 21:
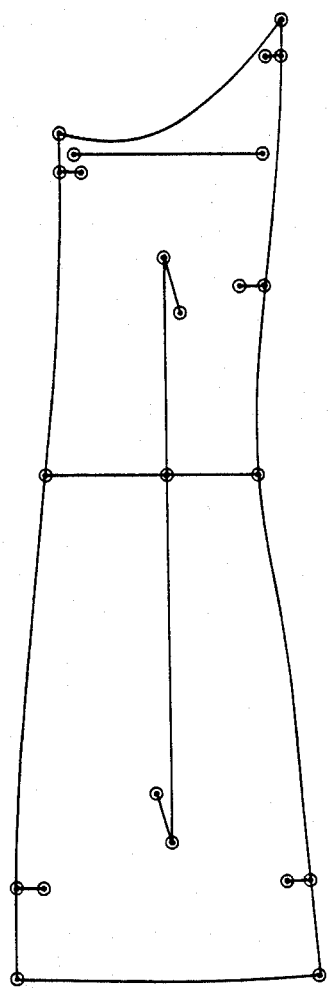
FIG. 21 is an explanatory diagram used to explain a processed data for a pattern cutout.

In this manner, the paper pattern data as shown in FIG. 21 is obtained. In FIG. 21, the mark ⊙ indicates a feature point.

Embodiment 5:

The design pattern data prepared by the first and second embodiments can be processed in the following manner by man-machine interaction between an operator and the system by utilizing the graphic display unit 4, the keyboard 5, the tablet 6 and the stylus pen 7 according to steps S7–S9 as shown in FIG. 10A.

Figure 22:
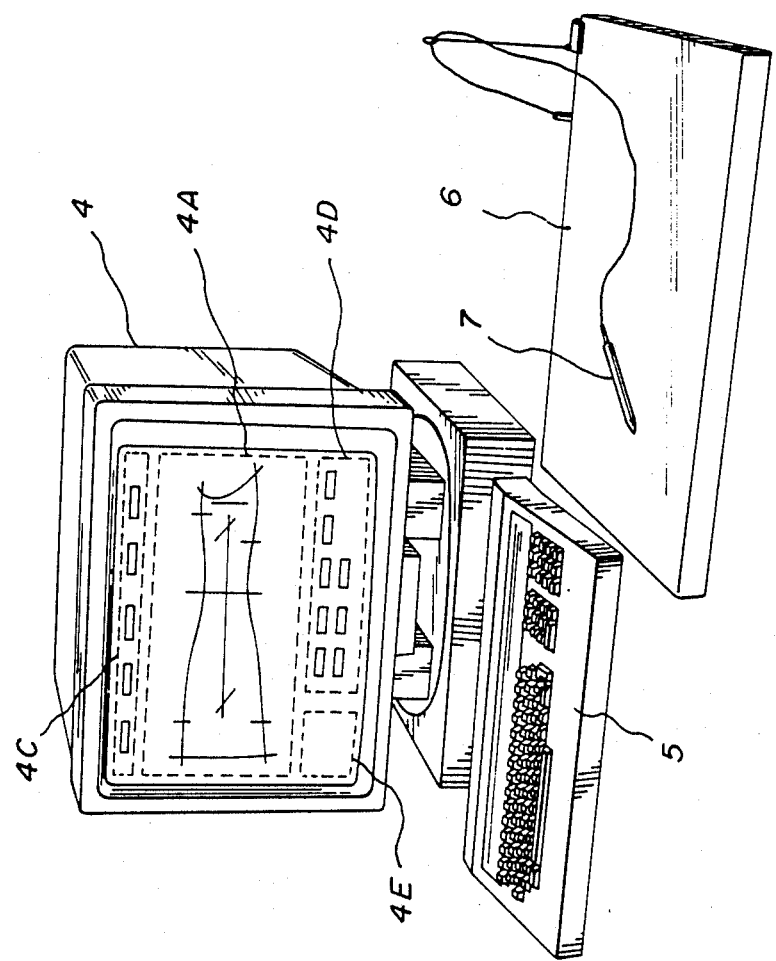
FIG. 22 is a front view showing one embodiment of a display screen of a graphic display unit.

An example of the display screen of the graphic display unit 4 is shown in FIG. 22. In FIG. 22, the display screen 4A of the graphic display unit 4 is divided into a pattern displaying region 4B which occupies a substantial portion of the display screen 4A, an auxiliary menu displaying region 4C arranged above the pattern displaying region 4B, a function menu displaying region 4D arranged below the pattern region 4B and a response message displaying region 4E.

Examples of the auxiliary menus to be displayed on the displaying region 4C are as follows:

| Enlargement | Rewrite | Go | Cancel Selection | Reset |

Two examples of function menus to be displayed in the displaying region 4D are as follows:

Example 1

| Definition of axis | Correction of straight line | | Correction of curved line | Correction of point | | Generation of point | |
|---|---|---|---|---|---|---|---|
| X axis | Interconnection between ends | Extension of a line segment | Interconnection between curved lines | Delete | Free move | Point I | Recognition | Delete |
| Y axis | Interconnection between intermediate points | Vertical correction | Adjustment of curved lines | Add | Delete interior point | Point N | Definition | Cancel |
| | Extension of a point | Horizontal correction | | Move other point | | Interior point | End |

Example 2

| Outer profile line | Axis of symmetry | Interior line | Grain line | Outer profile code | Interior code | Grain line rule | Register |
|---|---|---|---|---|---|---|---|
| Interior point | Interior point code | Names of parts | | | | | |

An example of a response message to be displayed in the displaying region 4E will be explained. For instance, if "Free move" menu for the correction of a point is instructed, the displaying region 4E displays the following response message:

1. Pick-up of a point to be moved, and
2. Pick-up of a position of destination of the move and then informs an operator of operation procedure.

Figure 23:
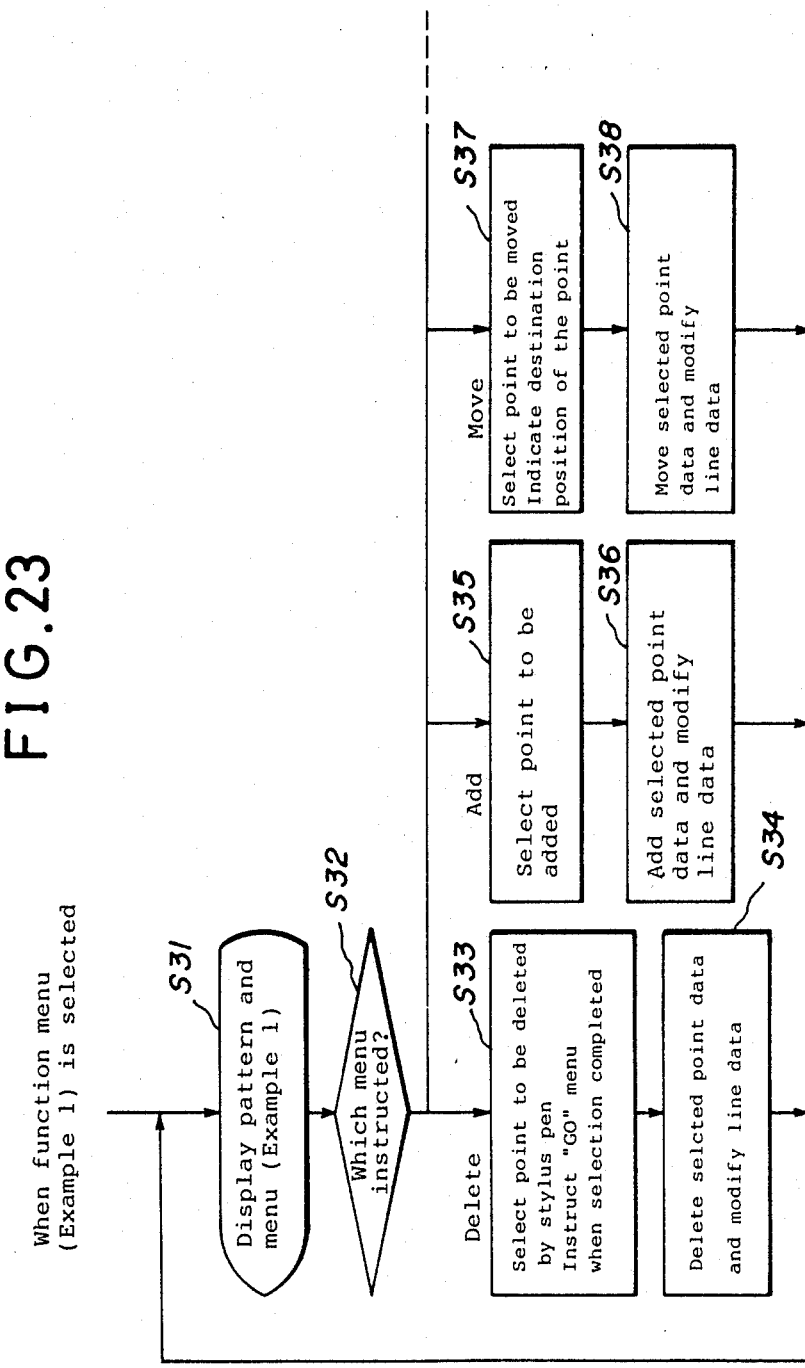
FIG. 23 is a flowchart illustrating one example of a process for deleting, adding and moving point data by a man-machine interaction system.

Next, one example of a control procedure for deletion, addition, and movement of point data by man-machine interaction when, for instance, Example 1 is selected as function menu is shown in steps S31–S38 in FIG. 23. For instance, point data erroneously produced by dust or dirt can be deleted by steps S31–S34. In like manner, point data can be added, moved, or deleted by carrying out steps S31–S38 when an operator judges that a certain point series data is not suitable, when point series data are not correctly interconnected by the line-narrowing process in case that widths of lines are not uniform, or when point series data are not correctly interconnected in case that a cut-off line or an interior line is not uniform.

Embodiment 6

Figure 24:
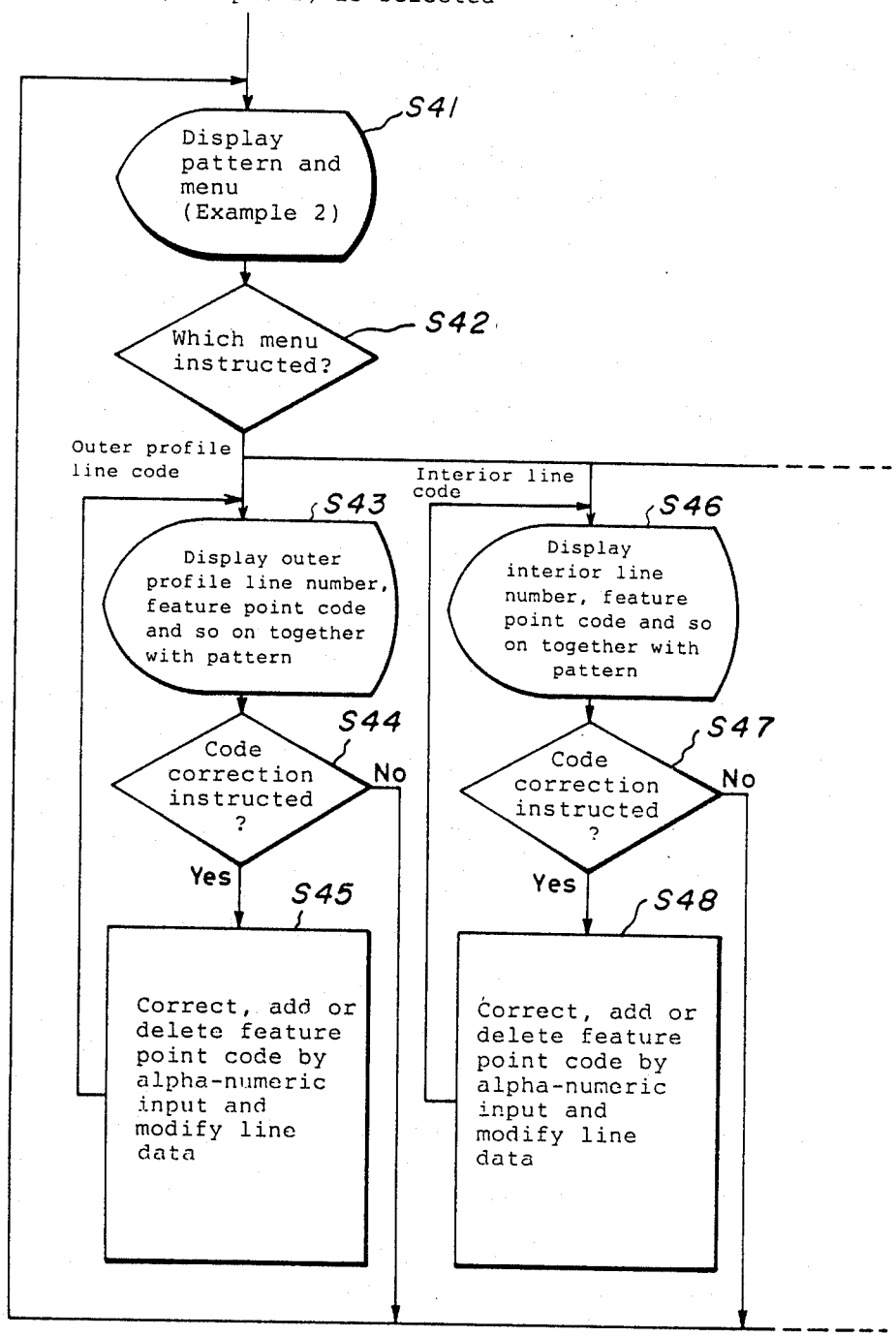
FIG. 24 is a flowchart illustrating one example of a process for correcting, adding and deleting feature point data by a man-machine interaction system.

In case that discrimination between a point of intersection of interior lines and a notch is judged based upon the length of the interior line or the shape thereof during the preparation of the above-mentioned feature point codes, when an error in a pattern is found out, or when it is found that a pattern has not been drawn or a specific mark has not been registered by watching the display unit 4, Example 2 is selected as a function menu, so that correction, addition, or deletion of feature point data is accomplished by man-machine interaction according to, for instance, steps S41–S48 as shown in FIG. 24.

While the above-described embodiments show an example in which a specific mark indicating a feature point is given by mutually intersecting profile lines, that is a method generally used in the case of the preparation of an apparel design pattern by a pattern-maker, it is to be understood that the present invention is not limited to the above-mentioned method and that when an image reader 1 capable of recognizing various colors is used, the computer 2 can recognize feature points with a colored mark. Alternatively, marks in various shapes can be used. For instance, marks such as Δ, ↑ or the like each having a geometric characteristic may be drawn at positions adjacent to feature points to be served to recognize feature point data.

Alternatively, data or specific marks erroneously drawn on a sheet of paper or a cut-out pattern can be easily corrected by man-machine interaction. In addition, since a profile and interior lines of a design pattern are displayed on the screen 4A of the graphic display unit 4, additional pattern data can be added to any desired position.

The present invention has been described in the case that picture elements are classified into two types of colors, i.e., black and white picture elements, but the present invention is not limited only to the use of black and white picture elements. This is, any two colors which can be distinguished from each other may be used.

According to the present invention, the processing of outer profile data including recognition of feature points can be carried out at a high speed in a simple manner without requiring a special operator by merely reading design pattern data drawn on a sheet of paper or cut-out pattern paper by the image reader 1, so that the pattern data can be inputted into a computer-assisted design system or design pattern data can be registered into a computer at a high speed without failure.

Furthermore, according to the present invention, the cone method or the like is used to compress line data and then feature points are recognized, so that each line data can be inputted with a determination whether the inputted line data correspond to a straight line or a curved line. As a result, design pattern data can be expressed in a distinct manner and can be prepared with less data. Therefore, the present invention is very effective in the case of inputting design pattern data in the apparel industry, in which various kinds of pattern designs and changes in the size of design patterns are required frequently.

Moreover, according to the present invention, high speed data processing of a design pattern having internal lines can be accomplished, including recognition of feature points, so that it is ensured that design pattern can be inputted automatically without failure.

What is claimed is:

1. A method for forming apparel design pattern data comprising the steps of:

scanning with an image scanner an apparel design pattern that has predetermined marks by which feature points can be discriminated in X and Y directions perpendicular to each other to generate binary representations of picture elements representing the apparel design pattern;

preparing X-Y point series data associated with X and Y direction addresses in an X-Y point series formed by discriminating central picture elements located substantially centrally within the apparel design pattern, and profile picture elements which correspond to picture elements located in a profile portion of the apparel design pattern;

extracting from said X-Y point series data positional data corresponding to feature points in the apparel design pattern;

dividing and storing X-Y point series data between respective adjacent feature points as line data, each of said X-Y point series consisting of X and Y direction addresses with respect to an origin point of each line data, intermediate points of each line data, and an end point of each line data, the origin and end points corresponding to feature points;

arranging the line data to define one complete trace of an outer profile line arond the apparel design pattern and preparing X-Y point series data in which feature point codes represent contents with respect to feature points corresponding to the start and end points of each line data; and storing the prepared X-Y point series data;

wherein the step of dividing the X-Y point series data between adjacent feature points includes the step of deleting intermediate points when the line data represents a straight line, and further includes:

when the line data represents a curved line, the steps of defining a first cone having a center line coinciding with a line interconnecting successive first and second points and starting from one of the adjacent feature points, and has a predetermined angle defined around the first point and of determining whether or not a succeeding third point is contained in the first cone; and when the third point is contained in the first cone, deleting the second point and defining a second cone having a center line coinciding with a line interconnecting the first and third points and which includes a predetermined angle defined around the first point to determine whether or not a succeeding fourth point is contained in a cone common with the first and second cones; and when a fourth point is not contained in the common cone, selecting the fourth point as the intermediate point; and wherein the step of preparing the X-Y point series data with respect to a run consisting of successive profile picture elements corresponding to a profile portion of the apparel design pattern for each line in the Y direction includes the steps of selecting a mode of interconnection of the profile picture elements in each run based upon an interconnection relationship of runs between three successive lines in the Y-direction and extracting interconnecting picture elements to narrow the runs.

2. A method for forming apparel design pattern data as claimed in claim 1, wherein runs in three successive lines $l_i-1$, $l_i$ and $l_i+1$ are represented by $LB_j$ ($j=1, 2, \ldots, n$), LC and $LN_k$ ($k=1, 2, \ldots, m$), respectively, and wherein the method further includes the step of identifying one of a plurality of picture element patterns from the picture elements wherein the picture element patterns are defined in accordance with a mode of interconnection of profile picture elements adjacent to each other in the X direction and comprise:

(1) an isolated portion where there exists no $LB_j$ or $LN_k$ in relation to an LC;

(2) a start point A where there exists no $LB_j$, but exists one $LN_k$ in relation to an LC;

(3) a start portion B where there exists no $LB_j$, but exists a plurality of $LN_k$ in relation to an LC;

(4) an end portion A where there exists no $LN_k$, but exists at least one $LB_j$ in relation to an LC;

(5) an end portion B where there exists no $LN_k$, but exists a plurality of $LB_j$ in relation to an LC;

(6) an intermediate portion B where there exists one $LB_j$ and one $LN_k$ in relation to an LC; and (7) an intermediate portion B where there exists one or more $LB_j$ and $LN_k$ in relation to an LC and there exist two or more $LB_j$ or $LN_k$.

3. A method for forming apparel design pattern data as claimed in claim 1, further comprising the steps of:

displaying the X-Y point series data on a graphic display unit; and carrying out modification including correcting, supplementing, and deleting X-Y point series data or feature-point codes corresponding to the X-Y point series data displayed on the graphic display unit.

4. A method for forming apparel design data comprising the steps of:

placing in an image reader a sheet-like apparel design pattern cutout obtained by cutting an outer profile line of an apparel design pattern drawn on a sheet of paper in such a way that feature points of the apparel design pattern can be discriminated on a plane having a contrasting background color with respect to the color of a surface of the apparel design pattern cutout;

scanning with the image reader the apparel design pattern cut-out in X and Y directions perpendicular to each other by an image reader to prepare binary picture elements corresponding to the apparel design pattern;

interconnecting profile picture elements corresponding to an outer profile line of picture elements corresponding to the outline of the apparel design pattern in the binary picture element data, for every three scanning lines sequentially scanned in the Y direction to prepare X-Y point series data consisting of X and Y direction addresses in an X-Y point series defining one complete trace of the outer profile line of the apparel design pattern;

extracting positions corresponding to feature points from the X-Y point series data;

dividing and storing X-Y point series data between respective adjacent feature points as line data; each of the X-Y point series consisting of X and Y direction addresses with respect to X-Y point series interconnecting a start point, intermediate points, and an end point of each line data, wherein the start and end points correspond to feature points;

analyzing a selected judging area provided for each feature point one line data by one line data and interconnecting a feature point of one line data to a feature point of a different line data and redefining both of the feature points to correspond to a midpoint between the feature points to prepare one round data of the outer profile line of the apparel design pattern cut-out;

preparing X-Y point series data in which feature point codes representative of the feature points corresponding to the start and end points are affixed to the start and end points of each line data of the data comprising one round data of the outer profile line of said apparel design pattern cutout; and storing the X-Y point series data;

wherein the step of dividing the X-Y point series data between the adjacent feature points includes the step of deleting intermediate points when the line data represents a straight line; and when the line data represents a curved line, the steps of defining a first cone having a center line coinciding with a line interconnecting successive first and second points and starting from one of the adjacent feature points, and has a predetermined angle defined around the first point, and of determining whether or not a succeeding third point is contained in the first cone; and when the third point is contained in the first cone, deleting the second point and defining a second cone having a center line coinciding with a line interconnecting the first and third points and which includes a predetermined angle defined around the first point to determine whether or not a succeeding fourth point is contained in a cone common with the first and second cones; and when a fourth point is not contained in the common cone, selecting the fourth point as the intermediate point; and wherein the step of preparing the X-Y point series data, with respect to a run of successive pattern picture elements corresponding to the apparel design pattern in picture elements obtained in one scanning line in the Y direction includes the steps of establishing an interconnection relationship among the runs of three successive scanning lines in the Y direction and extracting profile line picture elements with one scanning line as a unit.

5. A method of forming apparel design pattern data as claimed in claim 4, wherein runs in three successive lines $l_i-1$, $l_i$ and $l_i+1$ are represented by $LB_j$ (j=1, 2, . . ., n), LC and $LN_k$ (k=1, 2, . . . , m), respectively, and wherein the method further includes the step of identifying one of a plurality of picture element patterns from the picture elements wherein the picture element patterns are defined in accordance with a mode of interconnection of profile picture elements adjacent to each other in the X direction and comprise:

(1) an isolated portion where there exists no $LB_j$ or $LN_k$ in relation to LC;

(2) a start portion A where there exists no $LB_j$, but exists one $LN_k$ in relation to and LC;

(3) a start portion B where there exists no $LB_j$, but exists a plurality of $LN_k$ in relation to LC; and (4) an end portion A where there exists no $LN_k$, but exists one $LB_j$ in relation to LC, and wherein in the case of the isolated portion no profile line picture elements of the line $l_i$ are extracted, in the case of the start and end portions all the picture elements in the line $l_i$ are extracted as profile line picture elements, and in the case of the intermediate portion, when left and right ends of a common portion of the three lines $l_i-1$, $l_i$ and $l_i+1$ are represented by $Y_A$ and $Y_B$, respectively, profile picture elements from the left end profile picture element of the line $l_i$ to the position of the left end $Y_A$ and profile picture elements from the position of the right end $Y_B$ to the right end profile picture element of the line $l_i$ are extracted as profile line picture elements to produce the X-Y point series data.

6. A method for forming apparel design pattern data as claim 4, further comprising the steps of:

displaying the X-Y point series data o a graphic display unit; and carrying out modification including correction, addition, or deletion of the X-Y point series data and feature-point codes corresponding to the X-Y point series data displayed on the graphic display unit through man-machine interaction.

7. A system for forming apparel design pattern data comprising:

means for scanning an apparel design pattern having predetermined marks by which feature points can be discriminated in X and Y directions perpendicular to each other to generate binary picture element data comprising a plurality of picture elements;

means for preparing X-Y point series data associated with x and Y direction addresses in an X-Y point series formed by interconnecting substantially central picture elements with picture elements corresponding to a profile portion of said binary picture element data;

means for extracting positions corresponding to the feature points from said X-Y point series data;

means for dividing and storing X-Y point series data between respective adjacent feature points as line data, each of said X-Y point series data consisting of X and Y direction addresses with respect to X-Y point series interconnecting a start point, intermediate points, and an end point of each line data, said start and end points corresponding to feature points;

means for selecting said line data so as to define one complete trace of an outer profile line around the design pattern and preparing X-Y point series data in which feature point codes represent feature points corresponding to said start and end points are associated with said start and end points of each line data; and means for storing said X-Y point series data;

wherein said means dividing the X-Y point series data between said adjacent feature points includes means for eliminating said intermediate points when said line data represents a straight line;

means for judging whether a succeeding third point is contained in a first cone when said line data represents a curved line, said first cone having a center line coinciding with a line interconnecting successive first and second points, starting from one of said adjacent feature points, and which has a predetermined angle defined around said first point;

means for eliminating said second point, when a third point is contained in said first cone; and means for judging whether a succeeding fourth point is contained in a common cone defining an area in common with said first cone and a second cone, said second cone having a center line coinciding with a line interconnecting said first and third points and which has a predetermined angle defined around said first point, said common cone being sequentially defined for a succeeding two points of said intermediate points to reduce the number of said intermediate points;

wherein said means for preparing said X-Y point series data includes, with respect to a run consisting of successive profile picture elements corresponding to the profile portion in the binary picture element data, means for judging a mode of interconnection of the profile picture elements in each run based upon an interconnection relationship of runs between three successive scan lines in the Y-direction to extract interconnecting picture elements to narrow said runs.

8. A system for forming apparel design pattern data as claimed in claim 7, wherein runs in three successive lines $l_i-1$, $l_i$ and $l_i+1$ are represented by $LB_j$ (j = 1, 2, . . . , n), LC and $LN_k$ (k=1, 2, . . . , m), respectively, and wherein the following seven patterns are defined in accordance with a mode of interconnection of profile picture elements adjacent to each other in said X direction, said patterns comprising:

(a) an isolated portion, wherein there exists no $LB_j$ or $LN_k$ in relation to the LC;

(b) a start point A, wherein there exists no $LB_j$, but there exists one $LN_k$ in relation to the LC;

(c) a start portion B, wherein there exists no $LB_j$, but there exists a plurality of $LN_k$ in relation to the LC;

(d) an end portion A, wherein there exists no $LN_k$, but there exists at least one $LB_j$ in relation to the LC;

(e) an end portion B, wherein there exists no $LN_k$, but there exists a plurality of $LB_j$ in relation to the LC;

(f) an intermediate portion B, wherein there exist one $LB_j$ and one $LN_k$ in relation to the LC; and (g) an intermediate portion B, wherein there exists one or more $LB_j$ and $LN_k$ in relation to LC and there exists two or more $LB_j$ or $LN_k$.

9. A system for forming apparel design pattern data as claimed in claim 7, further comprising:

means for displaying said X-Y point series data; and means for carrying out modifications to the X-Y point series data including correction, addition, and deletion of said X-Y point series data and feature-point codes corresponding to said X-Y point series data displayed on said display means through man-machine interaction.

10. A system for forming apparel design pattern data comprising:

means for receiving a sheet-like apparel design pattern cutout obtained by cutting an outer profile line of an apparel design pattern drawn on a sheet of paper in such a way that feature points of said apparel design pattern can be discriminated, wherein said cutout is supported on a plane having a background color that is substantially different in contrast from the color of said apparel design pattern cutout, and for scanning said apparel design pattern cutout in X and Y directions perpendicular to each other to prepare binary picture element data in the form of a plurality of picture elements, said scanning means for scanning line-by-line in a Y direction;

means for interconnecting profile picture elements corresponding to an outer profile line of picture elements corresponding to the profile of the apparel design pattern at every three scanning lines sequentially scanned in said Y direction to prepare X-Y point series data associated with X and Y direction addresses in an X-Y point series defining one complete trace of said outer profile line of said design pattern;

means for extracting positions corresponding to the feature points from said X-Y point series data;

means for dividing and storing X-Y point series data between respective adjacent feature points as line data, each of said X-Y point series consisting of X and Y direction addresses with respect to X-Y point series interconnecting a start point, intermediate points and an end point of each line data, said start and end points corresponding to feature points;

means for analyzing a judging area provided for each feature point one line data by one line data, for interconnecting each said feature point to a feature point of a different line data, and for shifting both of said feature points to a mid-point between said feature points to prepare said trace data of said outer profile line of said apparel design pattern cutout;

means for preparing X-Y point series data in which feature point codes representing feature points corresponding to said start and end points are associated with said start and end points of each line data of said data of said trace data of said outer profile line of said apparel design pattern cutout; and means for storing said X-Y point series data;

wherein said means dividing the X-Y point series data between said adjacent feature points includes:

means for eliminating said intermediate points when said line data represents a straight line;

means for judging whether a third point is contained in a first cone when said line data represents a curved line, said first cone having a center line coinciding with a line interconnecting successive first and second points and starting from one of said adjacent feature points, and which has a predetermined angle defined around said first point;

means for judging whether a succeeding fourth point is contained in a common cone including an area common with said first and a second cone, said second cone having a center line coinciding with a line interconnecting said first and third points and which has a predetermined angle defined around said first point; and means for reserving said fourth point as said intermediate point when said fourth point is not contained in said common cone, said common cone being sequentially defined for a succeeding two points of said intermediate points to reduce the number of said intermediate points; and wherein means for preparing said X-Y point series data includes, with respect to a run of successive pattern picture elements corresponding to said apparel design pattern in said picture element data obtained in the form of binary data of one scanning line in said Y direction, means for judging an interconnection relationship among the runs of three successive scanning lines in said Y direction to extract profile line picture elements with one scanning line as a unit.

11. A system for forming apparel design pattern data as claimed in claim 10, wherein runs in three successive lines $l_i-1$, $l_i$ and $l_i+1$ in the Y-direction are represented by $LB_j$ (j=1, 2, ..., n), LC and $LN_k$ (k=1, 2, ..., m), respectively, and wherein the following patterns are defined in accordance with a mode of interconnection between pattern picture elements adjacent to each other in the X direction, said patterns comprising:

(a) an isolated portion, wherein there exists no $LB_j$ or $LN_k$ in relation to the LC;

(b) a start portion A, wherein there exists no $LB_j$, but there exists one $LN_k$ in relation to the LC;

(c) a start portion B, wherein there exists no $LB_j$, but there exists a plurality of $LN_k$ in relation to the LC; and (d) an end portion A, wherein there exists no $LN_k$, but exists one $LB_j$ in relation to LC, and wherein in case of said isolated portion, no profile line picture elements of the line $l_i$ are extracted, in the case of said start and end portions, all the picture elements in said line $1_i$ are extracted as profile line picture elements; and in the case of said intermediate portion, when left and right ends of a common portion of the three lines $l_i-1$, $l_i$, and $l_i+1$ are represented by $Y_A$ and $Y_B$, respectively, profile picture elements from the left end profile picture element of the line $l_i$ to the position of said left end $Y_a$ and profile picture elements from the position of said right end $Y_B$ to the right end profile picture element of the line $l_i$ are extracted as profile line picture elements to prepare said X-Y point series data.

12. A system for forming apparel design pattern data as claimed in claim 10, further comprising:
   means for displaying said X-Y point series data; and
   means for carrying out modification of said X-Y point series data including correction, addition, and deletion of said X-Y point series data and feature-point codes corresponding to said X-Y point series data displayed on said graphic display unit through man-machine interaction.

* * * * *